Dec. 2, 1969

R. P. BURR 3,482,229

TAPE SYSTEM WITH EXTENDED SPEED RANGE

Filed Oct. 19, 1966

INVENTOR.
ROBERT P. BURR
BY
Morgan, Finnegan, Durham & Pine
ATTORNEYS.

INVENTOR.
ROBERT P. BURR
BY
Morgan, Finnegan, Durham & Pine
ATTORNEYS.

RANDOM INCREMENTAL OPERATION

SYNCRONOUS INCREMENTAL OPERATION

MEDIUM SPEED PHASE LOCKED SERVO OPERATION

HIGH SPEED PHASE LOCKED SERVO OPERATION

INVENTOR.
ROBERT P. BURR

United States Patent Office 3,482,229
Patented Dec. 2, 1969

3,482,229
TAPE SYSTEM WITH EXTENDED SPEED RANGE
Robert P. Burr, Huntington, N.Y., assignor to Photocircuits Corporation, Glen Cove, N.Y., a corporation of New York
Filed Oct. 19, 1966, Ser. No. 587,918
Int. Cl. G11b 5/00
U.S. Cl. 340—174.1                                 30 Claims This invention relates to tape data storage systems. This application includes subject matter common with copending applications Ser. No. 12,411 filed Mar. 2, 1960, (now Patent 3,055,695); Ser. No. 120,256 filed June 28, 1961, (now Patent 3,182,243); Ser. No. 321,511 filed Nov. 5, 1963 and now abandoned; and Ser. No. 536,541 filed Mar. 4, 1966.

The advances in digital computer technology have brought about increasing demands upon the input-output equipment that supplies data to the computer and receives data from the computer. For example, in time sharing techniques where many small users share computing time in a large, high speed computer, data must be transferred to and from the remote customer location. Typically, this is accomplished by means of a teletypewriter or the like linked to the central computing facility via ordinary telephone lines or special data transmission lines. It is not feasible to have the high speed computer wait while the data is supplied directly from the teletypewriter and therefore it is desirable to collect the data as it comes from the teletypewriter at a low random speed and thereafter rapidly transfer the data to the computer at a rate synchronous with the computer operation. Interconnections between computers present similar problems because of the differences in operating speeds and the types of data that are accepted and supplied. Also, time buffering is often required in order to achieve effective utilization of the computers since data must be fed to a computer when it is ready and must be accepted from the computer when produced whether or not the associated equipment is ready.

An object of this invention is to provide systems for effectively communicating between diverse types of digital equipment.

Another object is to provide data transfer systems for speed changing, time buffering, time synchronizing and the like.

Tape systems, and particularly magnetic tape systems, are potentially capable of achieving these objectives. Magnetic tape systems have long been used in combination with digital computers and the like for data storage but have only seen limited use in data transfer functions because of the difficulties encountered in operating throughout a wide range from low speed random recording and reading to the high speed synchronous operation required for direct operation with high speed computers.

In the above identified application Ser. No. 321,511 a tape drive system is presented including a direct capstan drive coupled to a fast response motor of the printed circuit type driven from a wide band, saturable, velocity servo amplifier. This system provides a bidirectional tape transport with highly accurate displacement control and which is capable of random as well as synchronous operation. Such systems eliminate many of the problems experienced with the electromechanical, contra-rotating, selectively energized, pinch roller systems. However, a need still exists for a more flexible tape transport system having a wider speed range so that full use can be made of the speed changing, time buffering, and other potential capabilities of tape systems.

A further object of this invention is to provide a tape transport system having extended operating ranges.

Another object is to provide a bidirectional tape transport system capable of random incremental operation as well as synchronous operation in either an incremental or a phase locked mode.

The foregoing and other objects may be understood more fully from the following specification which sets forth several illustrative embodiments of the invention. While the invention is described principally in connection with magnetic tape systems which are often preferred because of their smaller size, simpler control and improved data packing density, the invention is, nevertheless, applicable to other types of tape transport systems. The drawings are part of the specification wherein.

General discussion

Figure 1:
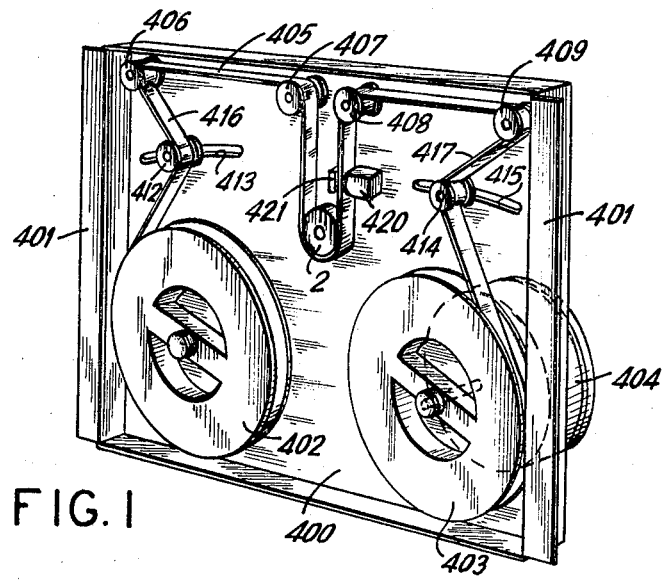
FIGURE 1 is a perspective view of a tape transport with mechanical storage arms for maintaining balanced loop tension on the tape.

The digital magnetic tape systems magnetic marks are recorded along one or more tracks on the tape. Packing densities on the order of 200 bits per inch are typical and hence, the distance between successive bits is approximately five thousandths of an inch (0.005″).

In multi-track systems the individual bits of a digital character are usually recorded simultaneously in the individual parallel tracks so that the bits of the character are aligned transversely across the tape. In a random incremental operation, the tape is accelerated from a rest condition to a selected operating velocity, such as four inches per second, whenever a character is to be recorded on or read from the tape. After the tape has reached the operating velocity, the character is recorded or read as the case may be and then the tape is rapidly decelerated to a stop. Since the spacing between bits is 0.005″, the tape drive system must be capable of accelerating the tape to the running speed and thereafter come to a stop during a tape displacement of less than 0.005″.

The requirements upon the tape drive for a serial data format are equally severe. In a serial data system the bits of a digital character are recorded one after the other along the same track. The tape tansport system must be capable of accelerating to the running speed before reaching the location of the first bit of the character and must decelerate and come to a stop within the space following the last bit.

In the tape transport system in accordance with this invention the tape is directly driven by a capstan which in turn is coupled to the shaft of a high performance DC motor such as the printed circuit motor known for its high pulse torques, low mechanical inertia, negligible electrical time constant, lack of preferred positions and linear acceleration-deceleration characteristics. The motor is preferably servo controlled so that the same exact running speed will be achieved during each individual random incremental operation. During the acceleration interval a relatively large current pulse of known magnitude is used to energize the motor to achieve a rapid acceleration. Since the magnitude of the current pulse is known, the running velocity at termination of the acceleration interval is accurately controlled and also known, and the acceleration characteristic of the motor is linear and known, the tape displacement during the acceleration interval is accurately controlled. During the deceleration interval, a reverse current pulse of approximately the same magnitude is used to energize the motor and hence, tape displacement during the deceleration interval from the known running speed to a stop is likewise accurately controlled.

The tape transport system is designed so that the tape is accelerated to the running speed at which the bits are read and recorded, and thereafter comes to a complete stop less than half way to the next bit location. Thus, adequate space remains for subsequent acceleration to the running speed before reaching the next bit location. Not only does this arrangement provide uniform tape velocity during reading and recording, but more important, it eliminates an unstable cyclical operation which occurs when the tape alternatively stops short and long with respect to the desired midpoint between bit locations and misses this point by increasingly wider margins.

The tape acceleration is initiated by a start command which, in the recording operation, is usually in response to the receipt of data to be recorded and, in the reading operation, is usually externally generated when data is required from the tape. The tape deceleration is initiated by a stop command which is usually internally generated when the data is recorded or read as the case may be. As the rate of the incoming data increases, or the rate at which data is demanded increases, eventually a point is reached where the start commands occur prior to the tape coming to a complete stop. In such cases the transport system immediately again accelerates the tape and advances toward the next bit location. When the start commands occur at regularly spaced intervals, such as controlled by clock pulses from external equipment, the tape transport system operates in a synchronized incremental mode. The maximum tape velocity occurs under these conditions when start commands occur shortly after the stop commands so that the tape advances almost continuously at close to the servo controlled running tape velocity. Thus, in the synchronized incremental mode the maximum velocity is determined by the servo system which in turn is designed in accordance with the acceleration and deceleration characteristic of the motor in order to achieve proper random incremental operation avoiding the aforementioned instability problem.

Rather than reach the velocity limitations imposed by the incremental running speed, the tape transport system in accordance with this invention is designed to make a gradual transition from the incremental mode into a phase locked servo mode of operation as the occurrence rate of the start commands increases. This is accomplished by sensing the frequency or occurrence rate of the commands and adding a correction voltage to the servo drive signal which is a function of increasing frequency. In the incremental mode of operation the drive signal for the servo speed control is applied in on-off fashion, or in other words, a drive signal is applied only during the interval between a start command and the following stop command. This on-off drive signal is superimposed upon a second drive signal or correction voltage which is a function of the occurrence rate of the commands. The average tape velocity corresponds to the average magnitude of the combined drive signal. If the tape tends to lag, the interval between the start and stop commands increases thereby increasing the "on" portion of the first drive signal which in turn increases the average value of the motor drive signal to compensate for the lag. Likewise, an underspeed condition decreases the "on" portion of the first drive signal and decreases the average magnitude of the drive signal. Thus, in the phase locked mode of operation the tape velocity is precisely controlled on a bit by bit basis in accordance with the clock pulses as the data is recorded on, or read from, the tape.

Drive system block diagram

Figure 3:
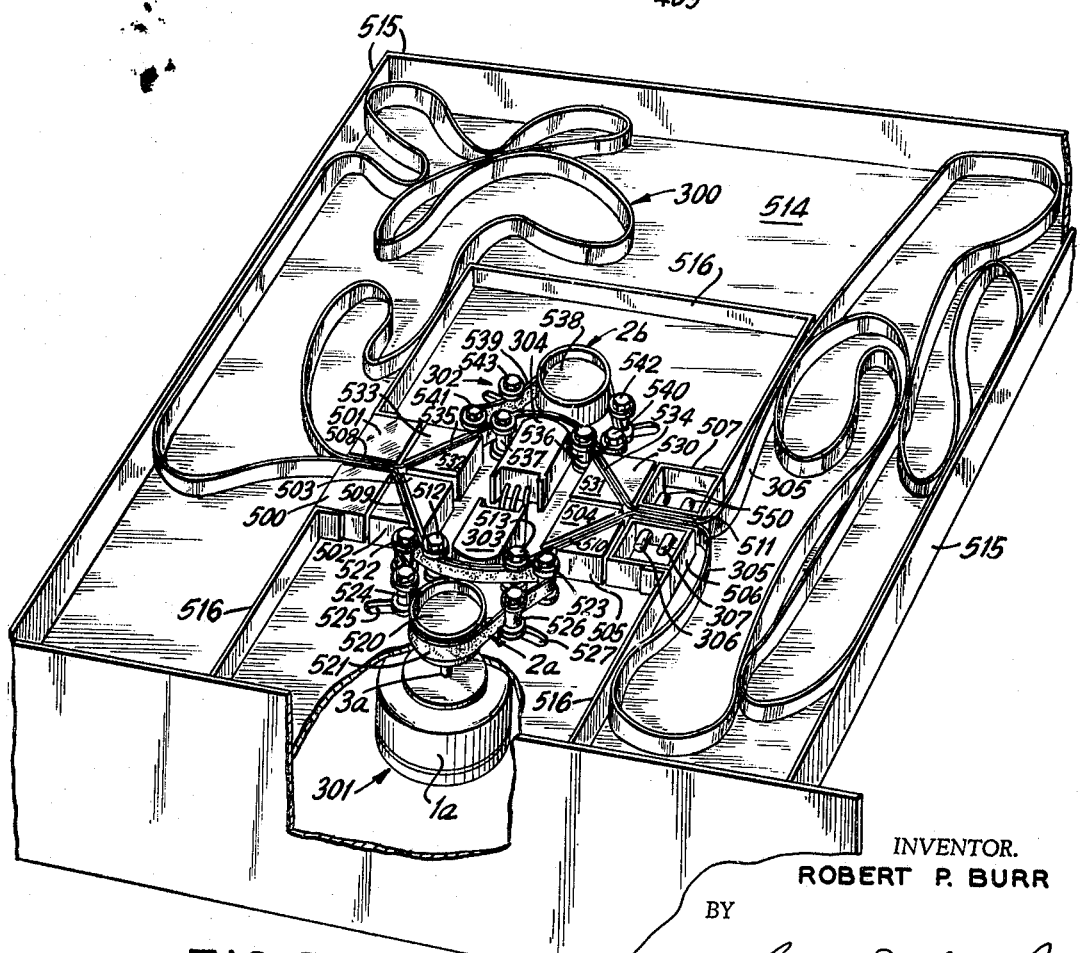
FIGURE 3 is a perspective view of a dual drive system for a tape buffer including belt type capstan arrangements.
Figure 2:
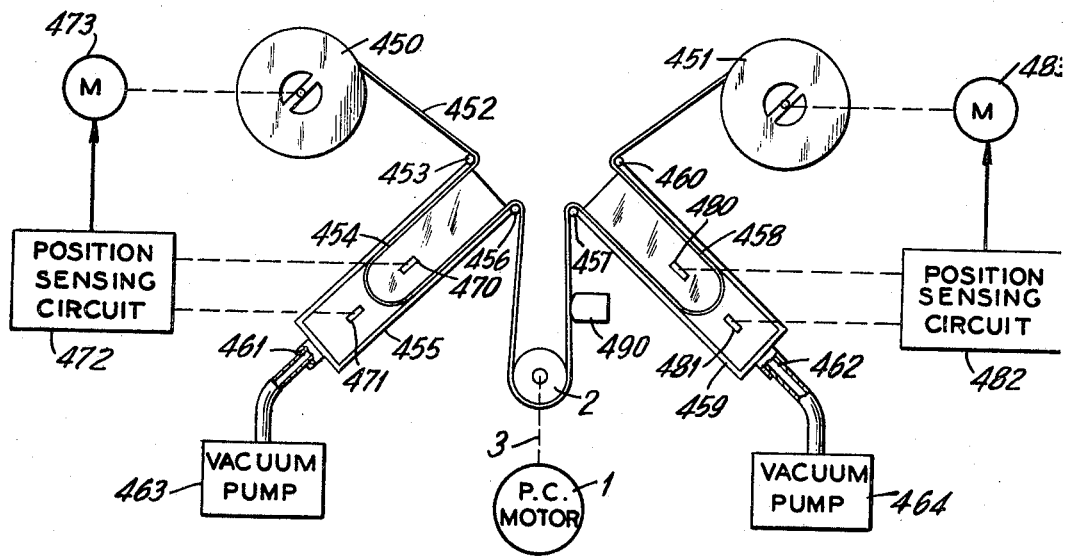
FIGURE 2 is a schematic view of a similar tape transport utilizing vacuum columns for tensioning the tape and showing the reel servo circuits.
Figure 4:
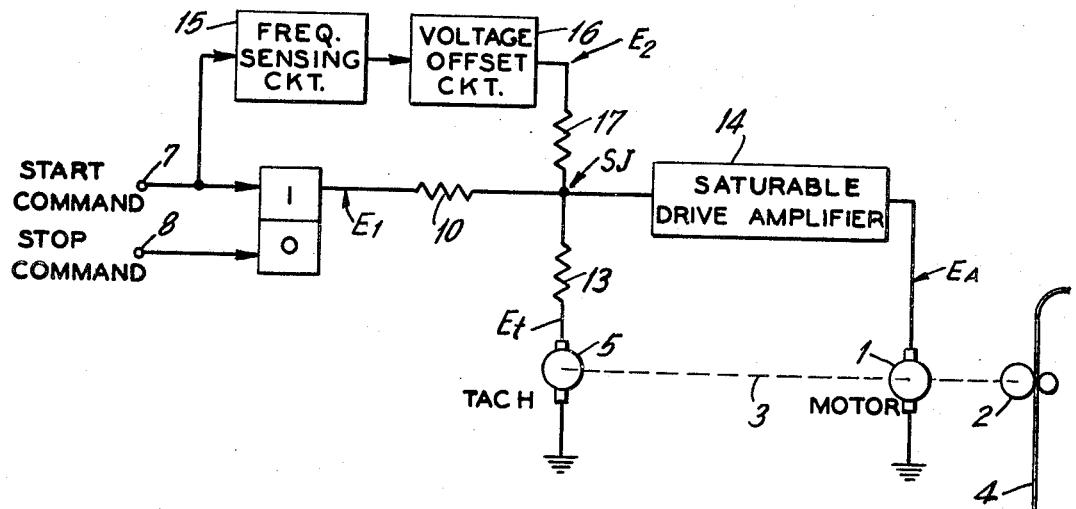
FIGURE 4 is a schematic diagram illustarting a drive motor energizing system partially shown in block form.

The mechanical portions of the tape transport systems in accordance with this invention are illustrated in FIGURES 1–3 and are described hereinafter. FIGURE 4 is a schematic block diagram of the motor control system in accordance with one embodiment of the invention which is used to drive the tape capstans shown in FIGURES 1–3.

Drive motor 1 is a high performance DC motor preferably of the printed circuit type including an armature with an annular array of printed conductors supported on a dielectric disc carrier. The armature of this motor does not include iron and therefore has a very low mechanical inertia, is essentially inductionless, produces a high pulse torque, and has acceleration-deceleration characteristics which are linear with respect to applied current. A tape capstan 2 is coupled to the motor shaft 3 and is maintained in constant, nonsliding, frictional engagement with magnetic tape 4. A speed sensing tachometer 5 is also coupled to motor shaft 3 and produces a potential $E_t$ which is directly proportional to the motor speed and tape velocity.

The start and stop commands are applied to the set and reset inputs of a flip flop circuit 6 via terminals 7 and 8, respectively. When the flip flop circuit is in the set state, as occurs in response to a start command, a positive drive signal $E_1$ appears at the set output and is coupled to a summing junction SJ via a resistor 10.

Figure 5:
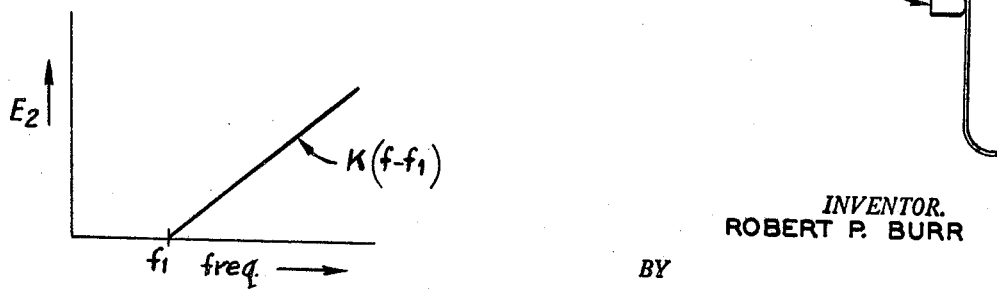
FIGURE 5 is a curve showing the voltage-frequency characteristic of drive signal $E_2$ in FIGURE 4.

The start commands supplied to terminal 7 are also supplied to the input of a frequency sensing circuit 15 which provides a DC signal proportional to the frequency or occurrence rate of the start commands. A voltage offset circuit 16 is coupled to the output of circuit 15 and provides a second drive signal $E_2$ having a characteristic as illustrated in FIGURE 5. Drive signal $E_2$ remains zero until a preselected frequency $f_1$ and thereafter increases linearly as a function of $(f-f_1)$, $f$ being the frequency of the start commands. Drive signal $E_2$ appearing at the output of circuit 16 is coupled to summing junction SJ via a resistor 17.

The tachometer feedback signal $E_t$ from tachometer 5 is coupled to the summing junction via a resistor 13. Tachometer 5 is connected to provide a negative signal to summing junction SJ whereas flip flop circuit 6 when in the set state and voltage offset circuit 16 are designed to provide signals $E_1$ and $E_2$, respectively, which are positive.

A saturable drive amplifier 14 receives its input signal from the summing junction and is connected to energize drive motor 1. In response to a positive input signal exceeding a selected magnitude, the amplifier goes into saturation in one direction and provides a positive current pulse for rapidly accelerating the motor. In response to a negative input signal exceeding a similar preselected magnitude, the amplifier goes into the opposite state of saturation and provides a negative current pulse for rapidly decelerating the motor. The amplifier has a linear response range between the saturated states and operates as a linear servo amplifier when the input signal is insufficient to drive the amplifier into saturation. Thus, saturable amplifier 14 acts as a pulse generator to provide acceleration and deceleration pulses, and also acts as a linear servo amplifier.

Figure 6:
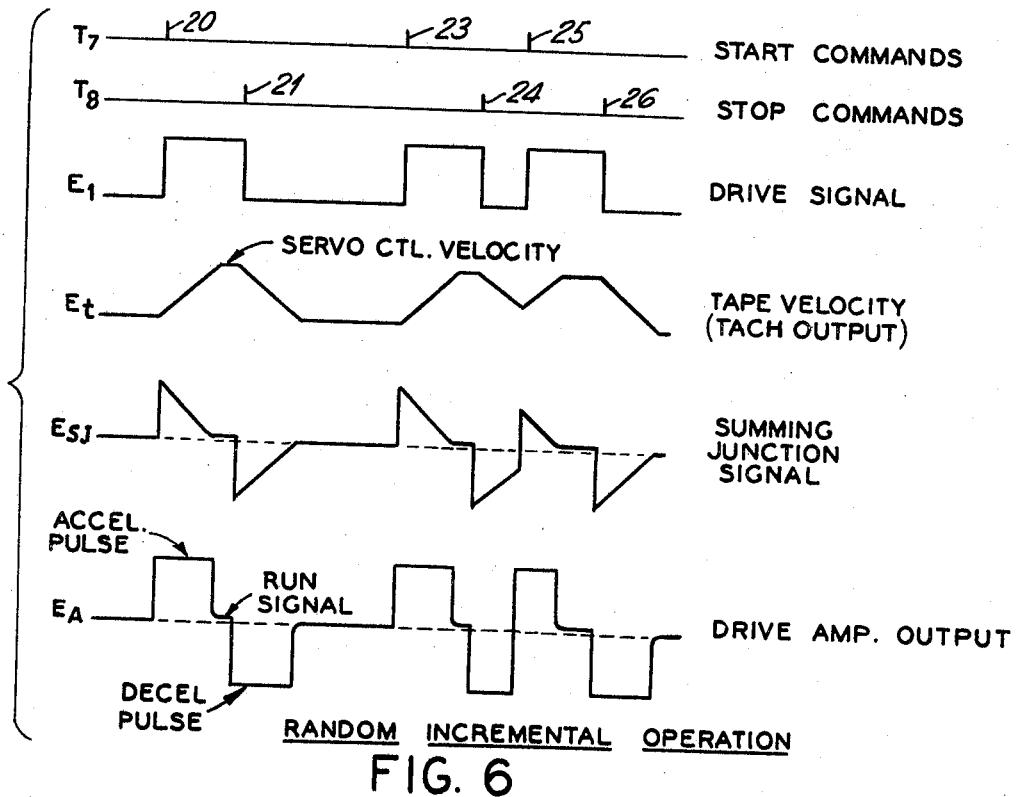
FIGURE 6–9 are curves showing the signals at various points in the system of FIGURE 4 for, respectively, random incremetal operation, synchronous incremental operation, medium speed phase locked operation, and high speed phase locked operation.

The characteristics of the system when operating in the random incremental mode are illustrated in FIGURE 6, curve $E_1$, $E_t$ and $E_A$ being the signals at the points designated in FIGURE 4, $E_{SJ}$ being the summing junction signal, and $T_7$ and $T_8$ being the signals at terminals 7 and 8 respectively. In this mode of operation the occurrence rate of start and stop commands is generally below the frequency $f_1$ and therefore drive signal $E_2$ is zero. When a start command 20 is applied to terminal 7, a flip flop circuit 6 is placed in the set state and therefore a positive drive signal $E_1$ is provided and coupled to the summing junction via resistor 10. The system is initially at rest and therefore the tachometer feedback signal $E_t$ is initially zero. Amplifier 14 responds to the large positive drive signal $E_1$ and is driven into saturation thereby providing a maximum current for energizing motor 1. As the motor accelerates, an increasingly negative voltage $E_t$ is provided by tachometer 5, which is in opposition to drive signal $E_1$ and therefore gradually decreases the magnitude of the signal at the summing junction. However, the summing junction signal remains sufficiently large to maintain amplifier 14 in saturation and therefore the amplifier provides maximum accelerating current to the motor throughout the acceleration interval. As the preselected running speed, for example, four inches per second, is approached, the summing junction signal is reduced to a value which permits amplifier 14 to operate in its linear range. At the running speed the tachometer feedback signal is equal to drive signal $E_1$ except for a small difference which provides the error signal at the input of the amplifier. The servo operation of the system then maintains the motor at a speed in accordance with the magnitude of drive signal $E_1$.

The system continues to run at the servo controlled speed until a stop command 21 (FIGURE 6) is applied to terminal 8 (FIGURE 4). The stop command returns flip flop circuit 6 to the reset state and therefore drive signal $E_1$ falls to zero. The large negative tachometer feedback signal $E_t$ is still present at the summing junction and therefore amplifier 14 is driven into negative saturation to provide maximum reverse current to decelerate motor 1. As the motor decelerates, the tachometer feedback signal decreases but is still sufficient to maintain the amplifier in saturation throughout most the deceleration interval until the motor comes to a stop.

Upon occurrence of the next start command 23 the system again accelerates to running speed and, upon the subsequent occurrence of a stop command 24, the syste mbegins to decelerate. It is not necessary for the system to come to a complete stop prior to reciept of the next start command. As illustrated in FIGURE 6, the next start command 25 occurs before the motor has stopped, and therefore flip flop circuit 6 immediately changes state and the motor again accelerates toward the running speed. The next stop command 26 then causes the motor to decelerate and the motor will come to a complete stop provided sufficient time is available before occurrence of the next start command.

As shown in curve $E_A$ of FIGURE 6, the acceleration pulses applied to the motor have a fixed and known magnitude. The ultimate motor speed is determined by the magnitude of drive signal $E_1$ and is likewise fixed and known. Therefore, since the motor has acceleration characteristics which are linear with respect to applied current, the circuit parameters can be so selected that the motor will achieve the preselected running speed within a predetermined tape displacement such as 0.002″. Accordingly, assuming the bit spacing is 0.005″ and that the tape is initially less than half way to the next bit location the tape will achieve running speed before reaching the next bit location and will continue to advance at the running speed until the bit location is reached. When the bit location is reached, a stop command is generated and the system decelerates. Essentially the same circuit parameters are controlling and therefore deceleration will likewise occur during a tape displacement of 0.002″ and, therefore, the tape will come to rest less than half way to the next bit location.

Figure 7:
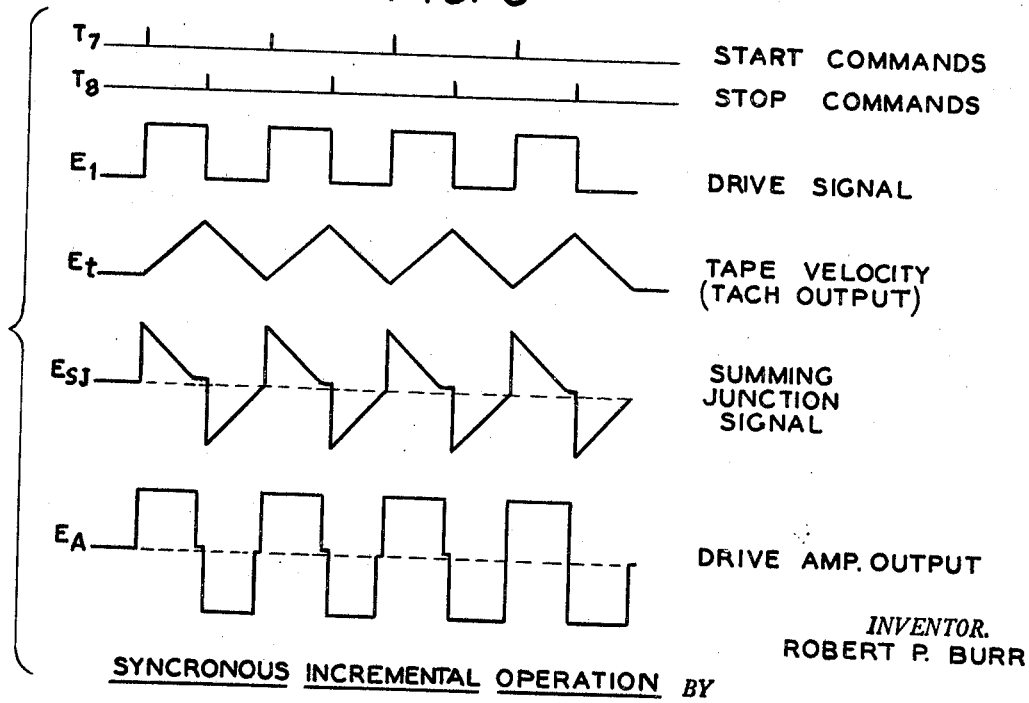

The characteristics of the system when operating in a synchronous incremental mode are illustrated in FIGURE 7. As illustrated in FIGURE 7, the start and stop commands occur such that the tape is decelerated almost immediately after reaching running speed, and is accelerated almost immediately after coming to a stop. As shown in curve $E_A$, saturable drive amplifier 14 goes from one saturated state to the other except perhaps for a very slight servo operation at the running speed or a slight pause prior to acceleration. The drive signal $E_1$ provided by flip flop circuit 6 has a fifty percent duty cycle, i.e. is on one-half the time and off one-half the time. As will be explained later, it is desirable to maintain a fifty percent duty cycle in the flip flop circuit when the system is in the higher speed, phase locked operation and therefore it is this condition which is designated as frequency $f_1$ which begins the operation of circuits 15 and 16 for providing the second drive signal $E_2$.

The change from the incremental operation, when the occurrence rate of commands is below frequency $f_1$, into the phase locked servo operation at frequencies above $f_1$ is a smooth gradual transition. In the phase locked mode of operation illustrated in FIGURE 8 the drive signal supplied to the summing junction is the sum of drive signal $E_2$, which is a function of the command occurrence rate, and drive signal $E_1$ which is an on-off signal controlled by the time interval between a start command and the following stop command. The motor is accelerated in response to each start command and is decelerated in response to each stop command because of the on-off nature of drive signal $E_1$. The average motor speed corresponds to the average magnitude of the combined drive signals $(E_1+E_2)$. Since the motor is running continuously, a tachometer feedback signal is always present opposing the drive signal, and therefore when these signals are combined at the summing junction the result is a relatively small error signal which is amplified by amplifier 14 operating in the linear portion of its range.

Figure 8:
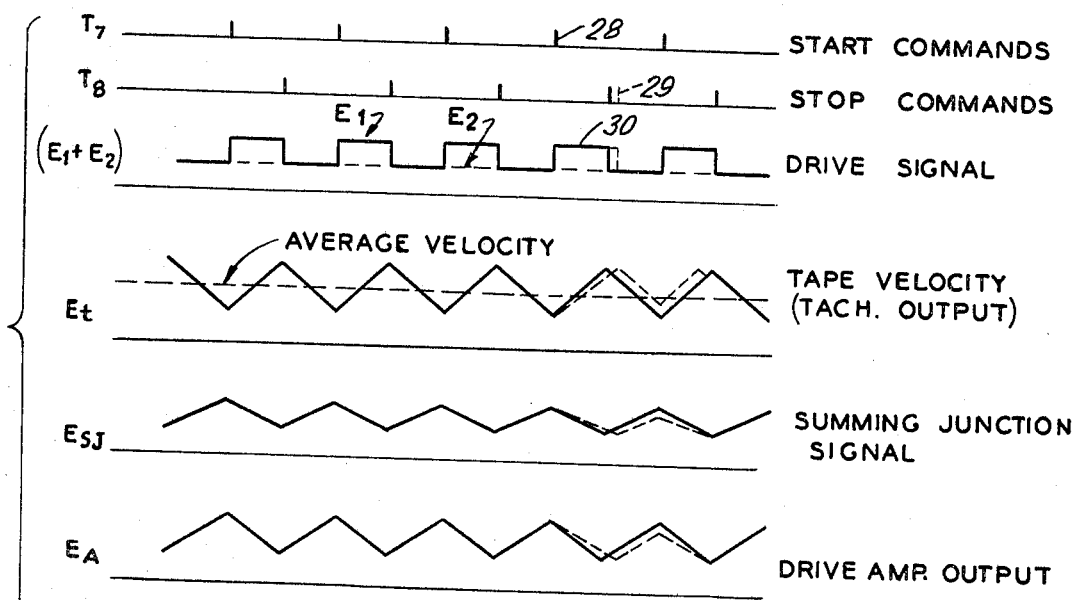

In the phase locked servo mode if the tape should lag momentarily, such as shown in FIGURE 8 following start command 28, it will take the tape longer to reach the next bit location. The next stop command 29 (shown in dotted lines) is therefore delayed and the "on" portion 30 of drive signal $E_1$ increases in duration. This increases the energy supplied to the motor and therefore compensates for the momentary lag. Likewise, should the motor overspeed and shorten the "on" portion of drive signal $E_1$ to decrease the average motor energization. In this manner the tape movement is accurately controlled in accordance with the commands, and the tape position is corrected or adjusted with respect to each set of commands to thereby maintain exact tape synchronism. The amplitude of the correction signal, i.e. frequency responsive drive signal $E_2$, is preferably of an amplitude which will nominally maintain a fifty percent duty cycle in flip flop circuit 6 since this permits a miximum variation in the duration of the "on" portion of the $E_1$ drive signal to correct for overspeed and underspeed conditions.

Figure 9:
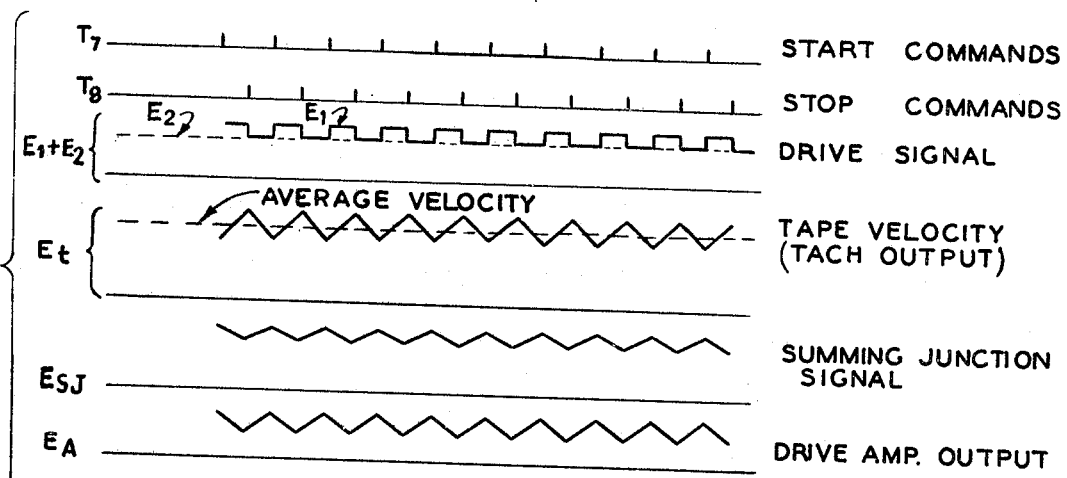

FIGURE 9 is similar to FIGURE 8 but shows the system characteristics in the phase locked mode of operation at a higher speed. The correction signal $E_2$ has increased in magnitude because of the higher occurrence rate of commands, and the on-off drive signal $E_1$ is superimposed thereon to maintain phase locked synchronism. The average velocity of the tape corresponds to the average value of the combined $E_1$ plus $E_2$ drive signal.

Detail schematic of drive system

Figure 10:
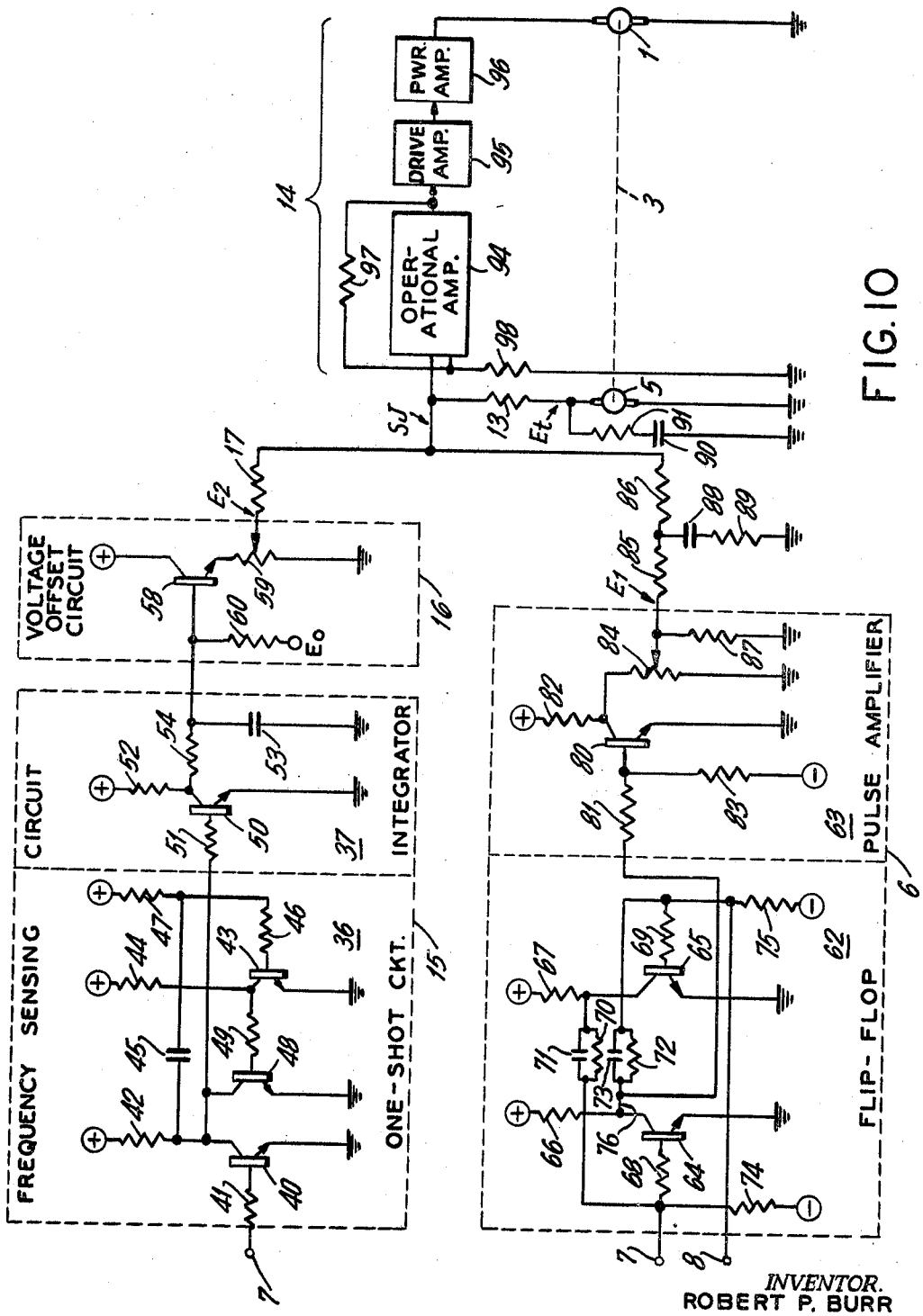
FIGURE 10 is a detailed schematic diagram of the system in FIGURE 4.

FIGURE 10 is a detailed schematic diagram of the motor drive system previously discussed in FIGURE 4.

Frequency sensing circuit 15 includes a one-shot multivibrator circuit 36 coupled to an integrating circuit 37 to provide a signal which is a function of the frequency of the start commands applied to terminal 7. The one shot circuit comprises three NPN type transistors 40, 43 and 48 each having a grounded emitter, the collector of transistor 43 being coupled to a positive potential source via a resistor 44 and the collectors of transistors 40 and 48 being coupled to the positive potential source via a common collector resistor 42. Terminal 7 is coupled to the base of transistor 40 via a resistor 41. One plate of a coupling capacitor 45 is connected to the collector of transistor 40 and the other plate is coupled to the base of transistor 43 via a base resistor 46. The junction between resistor 46 and capacitor 45 is coupled to the positive source of potential through a resistor 47. The collector of transistor 43 is connected to the base of transistor 48 via a resistor 49.

In the quiescent state, transistor 43 is conductive because of the positive potential supplied to the base via resistors 46 and 47, whereas transistors 40 and 48 are nonconductive. When a positive pulse (start command) is applied to terminal 7, transistor 40 is momentarily rendered conductive. The collector potential of this transistor falls to zero and, because of the coupling via capacitor 45, the base of transistor 43 is driven negative and transistor 43 therefore becomes nonconductive. Transistor 43 in turn renders transistor 48 conductive to thereby maintain the common collector potential of transistors 40 and 48 at ground even though the original input pulse has terminated.

When the one-shot circuit is in the active state, (transistors 40 and 48 conductive, transistor 43 nonconductive) capacitor 45 charges through resistor 47. Eventually the potential across capacitor 45 increases to the point where the base of transistor 43 becomes positive and therefore the transistor starts to conduct. This automatically decreases the conduction of transistor 48, and because of the regenerative coupling through capacitor 45, the transistors quickly return to the quiescent state. The length of time during which the one-shot circuit remains in the active state is determined by the RC time constant of resistor 47 and capacitor 45.

The common collector junction of transistors 40 and 48 is coupled to the base of an NPN type transistor 50 in integrating circuit 37 via an input resistor 51. The emitter of transistor 50 is grounded and the collector is coupled to a positive source of potential through a resistor 52. An integrating capacitor 53 is coupled across the collector-emitter circuit of transistor 50 in series with a resistor 54.

When the one-shot circuit is in the quiescent state, the common collector potential of transistors 40 and 48 is positive and therefore transistor 50 is fully conductive thereby coupling resistor 54 to ground. Under these circumstances capacitor 53 discharges through resistor 54 and the collector-emitter circuit of transistor 50. When the one-shot circuit is in the activated state, as occurs in response to a start command applied to terminal 7, transistor 50 is rendered nonconductive and therefore capacitor 53 is charged via resistors 52 and 54. Thus, an electrical pulse of a duration controlled by the time constant of the one-shot circuit is supplied to capactior 53 in response to each command pulse applied to terminal 7. Accordingly, disregarding for the moment other circuitry connected to capacitor 53, the potential across the capacitor tends to maintain a value proportional to the occurrence rate or frequency of the start commands.

Voltage offset circuit 16 includes an NPN type transistor 58 connected in an emitter follower configuration with the collector connected directly to a positive source of potential and the emitter connected to ground via an emitter resistor 59. The base of transistor 58 is connected to the junction between capacitor 53 and resistor 54 and is also connected to a negative offset potential $E_0$ through a resistor 60. Potential $E_0$ is selected to maintain the base of transistor 58 negative when the occurrence rate of command signals is below the preselected frequency $f_1$ thereby maintaining transistor 58 in a nonconductive state so that the potential across output resistor 59 remains zero. At frequencies above $f_1$, the potential developed across capacitor 53 in the integrating circuit overcomes the effect of potential $E_0$ and therefore the base of transistor 58 becomes increasingly positive as a function of $(f-f_1)$, $f$ being the command pulse frequency.

The potential developed across resistor 59 is likewise a function of $(f-f_1)$ and is taken from resistor 59 via an adjustable tap. The signal at the adjustable tap is designated drive signal $E_2$ and is supplied to summing junction SJ through resistor 17.

Flip flop circuit 6, in addition to a conventional flip flop circuit 62, also includes a pulse amplifier circuit 63. The flip flop circuit is of conventional design and includes a pair of NPN type transistors 64 and 65 each having grounded emitters and collectors connected to a positive source of potential via collector resistors 66 and 67, respectively. Terminals 7 and 8 which receive the start and stop commands are connected to the bases of transistors 64 and 65 via base resistors 68 and 69 respectively. A cross coupling network including a resistor 70 in parallel with a capacitor 71 is connected between the collector of transistor 65 and base resistor 68 of transistor 64, and a similar cross coupling network including a resistor 72 in parallel with a capacitor 73 is connected between the collector of transistor 64 and base resistor 69 of transistor 65. Base resistors 68 and 69 are coupled to a negative hold down potential via resistors 74 and 75 respectively.

When a positive start command is applied to terminal 7, transistor 64 is momentarily rendered conductive. The corresponding decrease in collector potential is coupled to the base of transistor 65 and renders that transistor nonconductive. This in turn creates a positive potential at the collector of transistor 65 which is coupled to the base of transistor 64 to maintain transistor 64 conductive after the input pulse has terminated. When transistor 64 is conductive, and transistor 65 is nonconductive, the flip flop circuit is considered in the set or "one" state.

Similarly, when a positive stop command pulse is applied to terminal 8, transistor 65 is momentarily rendered conductive. Because of the regenerative cross coupling between the transistors, transistor 65 is thereafter maintained in a conductive state and transistor 64 is maintained in a nonconductive state. In this condition the flip flop circuit is considered as being in the reset or "zero" state.

Junction 76 at the collector of transistor 64 is coupled to the base of an NPN type transistor 80 in pulse amplifier circuit 63 via a resistor 81. The collector of transistor 80 is coupled to a positive source of potential through a resistor 82, the emitter is grounded, and the base of the transistor is coupled to a negative hold down potential through a resistor 83. The output signal is developed across a resistor 84 connected between the collector of transistor 80 and ground.

When flip flop circuit 62 is in the set state in response to a start command applied to terminal 7, the signal at junction 76 is at ground and therefore transistor 80 is non-conductive. Under these circumstances, a positive potential is developed across resistor 84 as determined by the voltage divider including resistors 82 and 84. When flip flop circuit 62 is placed in the reset state in response to a stop command applied to terminal 8, the potential at junction 76 becomes positive and therefore transistor 80 becomes fully conductive. Under these circumstances, the collector-emitter circuit essentially provides a short circuit across resistor 84, and hence, the potential across resistor 84 is substantially zero.

The drive potential $E_1$ developed across resistor 84 is taken from an adjustable tap on the resistor and supplied to summing junction SJ through series resistors 85 and 86 (the combined resistance being the equivalent of resistor 10 shown in FIGURE 4). A resistor 87 is coupled between the variable tap and ground, and a frequency responsive attenuation circuit including a resistor 89 in series with a capacitor 88 is coupled between ground and the junction of resistors 85 and 86. The function of capacitor 88 is to attenuate drive signal $E_1$ at the higher frequencies (above frequency $f_1$) since this reduces the quantity of useless AC signal supplied to the drive motor. In other words, if the drive signal were not attenuated it would achieve the same control in the phase locked servo mode, but the AC variation of the drive signal applied to the motor would be greater and result in excess heating of the motor.

A frequency responsive attenuation circuit including a capacitor 90 in series with a resistor 91 is similarly connected across tachometer 5 to, in like fashion, reduce the useless AC ripple of the tachometer output voltage at higher frequencies. The tachometer output voltage $E_t$ is coupled to summing junction SJ via a resistor 13.

Saturable amplifier 14 consists of three amplifier sections, an operational amplifier 94 followed by a drive amplifier 95 which in turn is followed by a power amplifier 96. Operational amplifier 94 is a bidirectional high gain DC amplifier having two input terminals connected to a first stage differential amplifier. Stabilizing negative feedback is provided by resistors 97 and 98 connected in series between the output of the amplifier and ground with the junction of the resistors connected to one input of the amplifier. The summing junction is connected to the other input of the operational amplifier. The operational amplifier and resistors 13, 17, 85 and 86 form a summing circuit for providing an amplified signal at the output of the operational amplifier which is proportional to the difference between the tachometer feedback signal $E_t$ (negative) and the sum of the drive signals $E_1$ plus $E_2$ (both positive). Preferably, the combined resistance of resistors 85 and 86 is equal to the resistances of resistor 17 and resistor 13 so that the summation will be on a directly proportional basis.

The amplified signal appearing at the output of operational amplifier 94 is then supplied to a drive amplifier 95 and thereafter to the output power stages of amplifier 96. The system is designed so that the output stages are driven into a saturated state when the summing junction signal exceeds a predetermined magnitude in either the positive or negative direction. In the saturated condition amplifier 96 provides maximum current to motor 1 during acceleration and deceleration, this maximum value being selected as previously indicated to achieve the necessary acceleration and deceleration within a predetermined tape displacement while the system is operating in an incremental mode.

Drive system with separate acceleration and deceleration pulse generators

Figure 11:
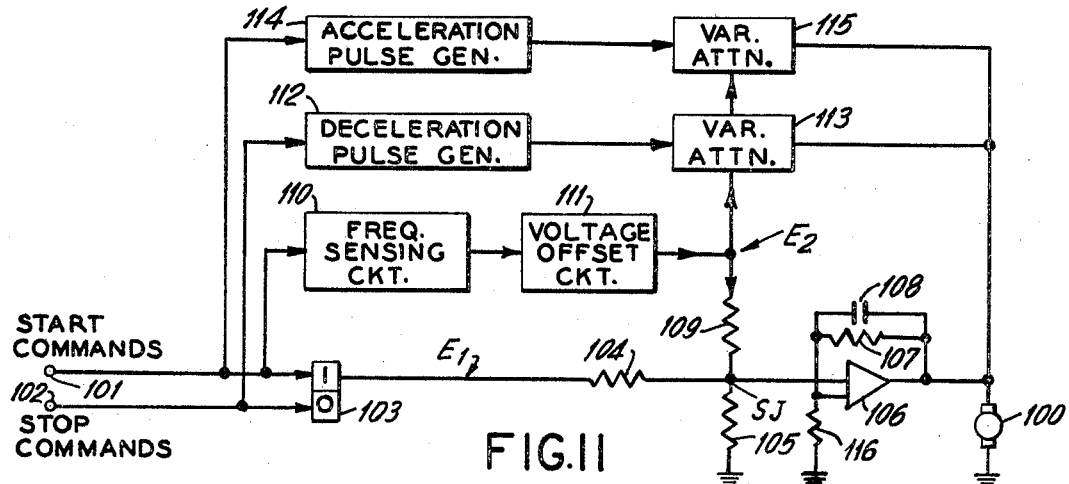
FIGURE 11 is a block diagram of an open loop drive system with separate acceleration and deceleration pulse generators.

Another embodiment of the motor drive system is shown in FIGURE 11 including a printed circuit drive motor 100 which is coupled to direct drive the tape via a capstan (not shown). The start and stop commands are applied to the set and reset inputs of a flip flop circuit 103 via terminals 101 and 102, respectively. The set output of flip flop circuit 103 provides a positive drive signal $E_1$ when in the set state, and this signal is coupled to summing junction SJ via a resistor 104. Terminal 101 is also coupled to the input of a frequency sensing circuit 110 which in turn is coupled to a voltage offset circuit 111, these circuits being similar to those previously described in FIGURE 4. The output of circuit 111, designated $E_2$, is coupled to the summing junction via a resistor 109. Amplifier 106 is connected to energize motor 100 and preferably includes two input terminals coupled to a differential input stage. Summing junction SJ is connected to one of these input terminals of amplifier 106. A phase compensation network including a resistor 107 in parallel with a capacitor 108 is connected across the amplifier and in series with a resistor 116. Terminal 101 is coupled to an acceleration pulse generator 114 which provides a positive pulse to motor 100 via a variable gain circuit 115 in response to a start command. Terminal 102 is coupled to a deceleration pulse generator 112 which provides a negative pulse to motor 100 via variable gain circuit 113 in response to a stop command. Attentuators 113 and 115 receive a control signal from circuit 111 and provide increasing attenuation in response to increases in drive signal $E_2$.

For low speed incremental operation, drive signal $E_2$ is zero. Under these conditions a start command energizes pulse generator 114 which provides an acceleration pulse to the motor. The start command also places flip flop circuit 103 in the set state which provides a positive drive signal $E_1$. After the acceleration interval the motor speed is controlled in open loop fashion in accordance with the magnitude of drive signal $E_1$ amplified in amplifier 106. Subsequently, when a stop command is applied to terminal 102, flip flop circuit 103 is reset and pulse generator 112 is activated to provide a deceleration pulse to brng motor 100 to a stop.

As the frequency of commands applied to terminals 101 and 102 increases, the system makes a gradual transition into a phase locked mode. As drive signal $E_2$ increases, the effect of pulse generators 112 and 114 is decreased and eventually eliminated, by the operation of attenuators 113 and 115. The motor responds to the combined drive signal $E_1$ plus $E_2$ as amplified by amplifier 106 and, as a result, the system goes into a phase locked mode of operation.

Tape system utilizing clock track

Figure 12:
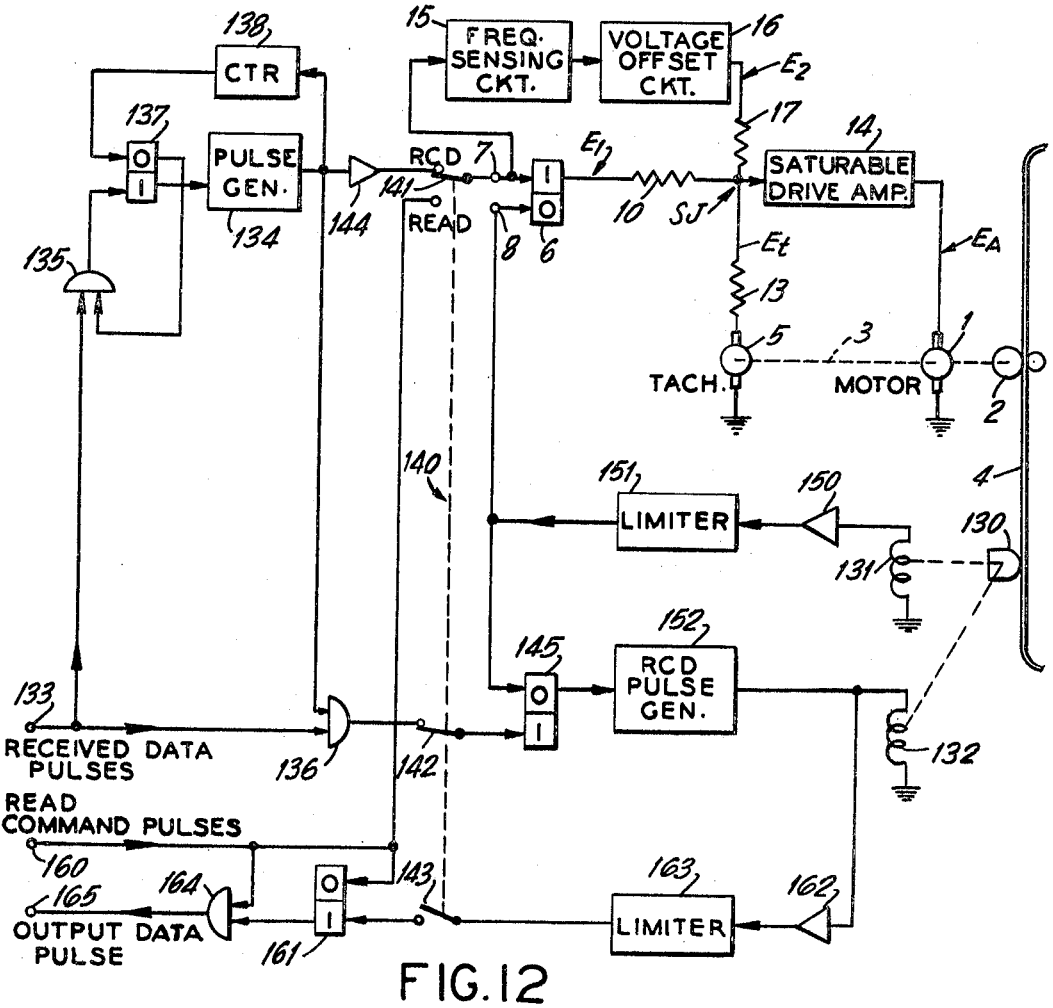
FIGURE 12 is a schematic diagram of a tape system using a clock track.

FIGURE 12 illustrates a more complete tape system including the recording and reading circuits and the logic control circuits which develop the start and stop commands for the motor drive. The basic motor drive portion of tie system includes components 1–17 wnich are the same as previously described in FIGURE 4, and hence, like reference numerals are utilized. The system illustrated in FIGURE 12 is for a serial data format wherein the data is recorded on, or read from, magnetic tape having thereon a data track and a prerecorded clock track.

Figure 12A:
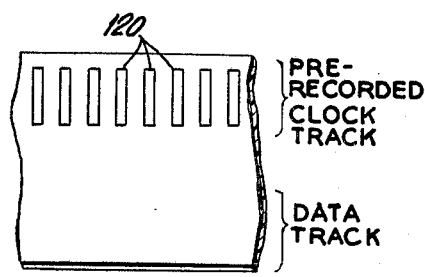
FIGURES 12A and 12B illustrate the data arrangement on the tape.
Figure 12B:
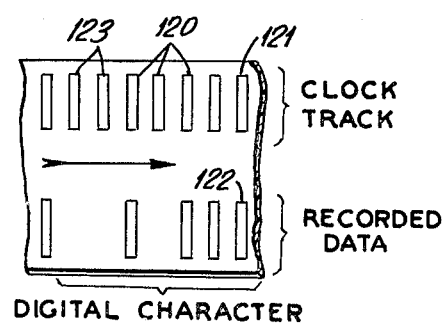

The magnetic tape and the data arrangement thereon are illustrated in FIGURES 12A and 12B. The tape is a typical magnetic tape including a dielectric base material such as Mylar coated with a ferromagnetic material and has a width sufficient to accommodate at least two tracks. Prior to the tape being used, clock pulses are permanently recorded on one of the tracks as shown in FIGURE 12A. For a typical packing density of 200 bits per inch, magnetic marks 120 in the clock track are spaced at regular 0.005" intervals. The magnetic marks in the clock track are used to identify the data bit locations during the recording and reading operations.

FIGURE 12B illustrates the arrangement of magnetic marks on the tape after data has been recorded. In the teletype or Baudot code, for example, a character includes seven bits, the first bit always being a "one" and the remaining six bits being either "ones" or "zeros" depending upon the nature of the particular character being recorded. Assuming tape movement toward the right as indicated by the arrow, the recorded character in FIGURE 12B reads from right to left as 1110100. The "ones" are recorded as magnetic marks in space registry with marks in the clock track, e.g. the first bit 122 is aligned with mark 121 in the clock track. A "zero" is indicated by the absence of a magnetic mark in the space aligned with a mark in the clock track, e.g. the bit locations aligned with marks 123 in the clock track.

In FIGURE 12 tape 4 is a two track tape and is advanced relative to the read-write heads 130 which include a read head aligned with the clock track to energize an associated winding 131 each time a mark in the clock track is detected, and a read-write head aligned with the data track that energizes associated winding 132 each time a mark is detected when in the reading mode, and records a mark on the tape each time the winding is energized in the recording mode.

The received data pulses are applied to an input terminal 133. In some cases the serial data pulses are accompanied by a train of synchronizing pulses, in which case the train of sync pulses is applied directly to terminal 7 in the drive system as start commands to control the recording operation. Normally, however, sync pulses are not supplied, but the bits within a character have a known time sequence and the sync pulses for controlling the recording operation can be generated internally as is done by pulse generator 134, in FIGURE 12.

Terminal 133 is connected to one input of a two input AND gate 135 and also to one input of a two input AND circuit 136. The reset output of a flip flop circuit 137 is coupled to the other input of AND gate 135 and the output of the AND gate is connected to the set input of flip flop circuit 137. Flip flop circuit 137 is initially in the reset state and therefore AND gate 135 is initially open. The leading edge of the first pulse, or bit, of a character passes through AND gate 135 and places flip flop circuit 137 in the set state.

The set output of the flip flop circuit is connected to the input of pulse generator 134 and activates the pulse generator when the flip flop circuit is in the set state. When activated, pulse generator 134 produces a train of synchronizing pulses at a rate which corresponds to the time sequence of bits in the digital character being received. A binary counter 138 is connected to the output of pulse generator 134 and counts the pulses. When the count is equal to the number of bits in the character, the counter supplies a pulse to the reset input of flip flop circuit 137 and thus resets the flip flop circuit. This again opens AND gate 135 so that the circuit is conditioned for receiving the leading bit of the next character.

When recording data on the magnetic tape, record-read switch 140 is placed in the position with movable contacts 141–143 in the positions as shown. The sync pulses generated by pulse generator 134 are supplied as start commands to terminal 7 of the drive system via a pulse amplifier 144 and movable contact 141. The sync pulses are also supplied to the other input of AND circuit 136, the output of this AND circuit being coupled to the set input of a flip flop circuit 145 via movable contact 142. In most serial codes, the leading bit is a "one" and indicates that a complete character will follow. This lead bit or lead pulse turns on pulse generator 134 which provides a train of corresponding sync pulses to terminal 7 and AND circuit 136. As the first sync pulse is applied to AND circuit 136, the lead pulse of the character is permitted to pass through, and since it is a "one," it places flip flop circuit 145 in the set state.

The first sync pulse applied to terminal 7 of the drive system as a start command places flip flop circuit 6 in the set state and therefore the drive system rapidly accelerates to the running speed in the manner previously explained in connection with FIGURE 4. Soon after reaching the running speed a magnetic mark is detected in the clock track and therefore a corresponding pulse is generated in winding 131. This pulse passes through a pulse amplifier 150 and a limiter circuit 151 which acts as a pulse shaper. The clock pulse which emerges from limiter circuit 151 is applied to the reset input of flip flop 145 and resets the flip flop. The reset output of flip flop 145 is coupled to winding 132 associated with the data track via a record pulse generator 152 which responds to the transient signal provided by flip flop circuit 145 as it is being reset. Accordingly, if flop flop circuit 145 has previously been placed in the set state, as is the case with the aforementioned lead bit, the clock pulse provided by limiter circuit 151 resets flip flop circuit 145 and therefore pulse generator 152 responds to the reset transient and generates a pulse which energizes winding 132 to record a mark on the magnetic tape. The detection of the mark in the clock track, the resetting of flip flop circuit 145, and the recording of a mark on the data track occurs essentially instantaneously and therefore the data mark appears on the tape transversely aligned with the mark in the clock track. The clock pulse provided by limiter circuit 151 is also applied to terminal 8 as a stop command and resets flip flop circuit 6 to initiate deceleration of the drive system.

The subsequent bits of the character are recorded in like fashion. A sync pulse is generated by pulse generator 134 corresponding to each bit, and this sync pulse is applied to AND circuit 136 which permits the bit to pass through into flip flop circuit 145. If the bit is a "one," flip flop circuit 145 is placed in the set state, and therefore when the subsequent clock pulse from limiter circuit 151 resets the flip flop circuit a mark is recorded on the magnetic tape. If the bit is a "zero," flip flop circuit 145 is not placed in the set state and therefore a transient is not generated when the clock pulse is applied to flip flop circuit 145 and therefore no magnetic mark is recorded.

If the incoming data is received from a teletypewriter or the like, the bits of a character are received at a relatively slow rate (on the order of 50 to 100 baud i.e. 50 to 100 bits per second) and the drive system operates in a synchronized incremental mode for the duration of the character. The individual characters may arrive at random intervals and, hence, the system operates in a random incremental mode with respect to the data on a character by character basis. On the other hand, if the data comes from external high speed computing equipment, the incoming data will normally be received at a much higher rate such as 2000 baud. In such cases, the first few bits are preferably blanks and permit the drive system to achieve running speed. Thereafter, the data is recorded while the drive system operates in a phase locked synchronous mode.

When retrieving data from the tape, record-read switch 140 is placed in its alternate position. The read commands are generated externally by the equipment receiving the data and are applied to input terminal 160. In the read mode terminal 160 is connected to terminal 7 of the drive system through movable contact 141, and therefore the read commands are used as start commands for the drive system. Winding 132 associated with the data track read-write head is coupled to the set input of a flip flop circuit 161 via a pulse amplifier 162, a pulse limited circuit 163 and movable contact 143. The set output of flip flop circuit 161 is connected to one input of a two input AND circuit 164, and the output of the AND circuit is connected to a data output terminal 165. Terminal 160 which receives the read command pulses is connected to the other input of AND circuit 164 and to the reset input of flip flop circuit 161. When a read command pulse is applied to terminal 160, this pulse places flip flop circuit 6 in the set state and therefore the drive system rapidly accelerates to the running speed. Shortly thereafter, the tape will reach the next bit location where a mark is detected in the clock track thereby energizing winding 131. Winding 131 provides a clock pulse which passes through amplifier 150 and limiter circuit 151 to reset flip flop circuit 6 and initiate deceleration of the drive system.

Simultaneously with the detection of the mark in the clock track, the presence or absence of a mark in the adjacent bit location in the data track is detected. If a mark is present signifiying that the recorded bit is a "one," a pulse is generated in winding 132. This pulse passes through amplifier 162 and limiter circuit 163 to place flip flop circuit 161 in the set state which in turn conditions AND circuit 164. The next read pulse applied to terminal 160 passes through conditioned AND circuit 164 and therefore an output pulse is supplied to terminal 165 indicating that a "one" was detected on the tape. The same read pulse applied to terminal 160 also resets flip flop circuit 161 so that it is in the proper condition for receiving the next bit read from the tape. If a mark is not present in the data track signifying that the bit is a "zero," winding 132 is not energized, flip flop circuit 161 is not placed in the set state, and therefore the next read pulse applied to terminal 160 will not produce an output pulse at terminal 165.

In the reading operation the drive system operates in either the random incremental mode, the synchronized incremental mode or the phase locked servo mode depending upon the occurrence rate of the read command pulses applied to terminal 160.

Although the system previously described in FIGURE 12 operates in a serial format, essentially the same system can be used in connection with a parallel format. In such a system additional data tracks are added to the tape, preferably one data track per bit in the character so that the entire character can be recorded simultaneously across the tape in separate tracks. In a parallel format pulse generator 134 and the associated logic circuitry can be eliminated and additional read-write heads and associated recording and reading circuitry are added corresponding to the additional data tracks.

Tape system utilizing a timing disc

Figure 13:
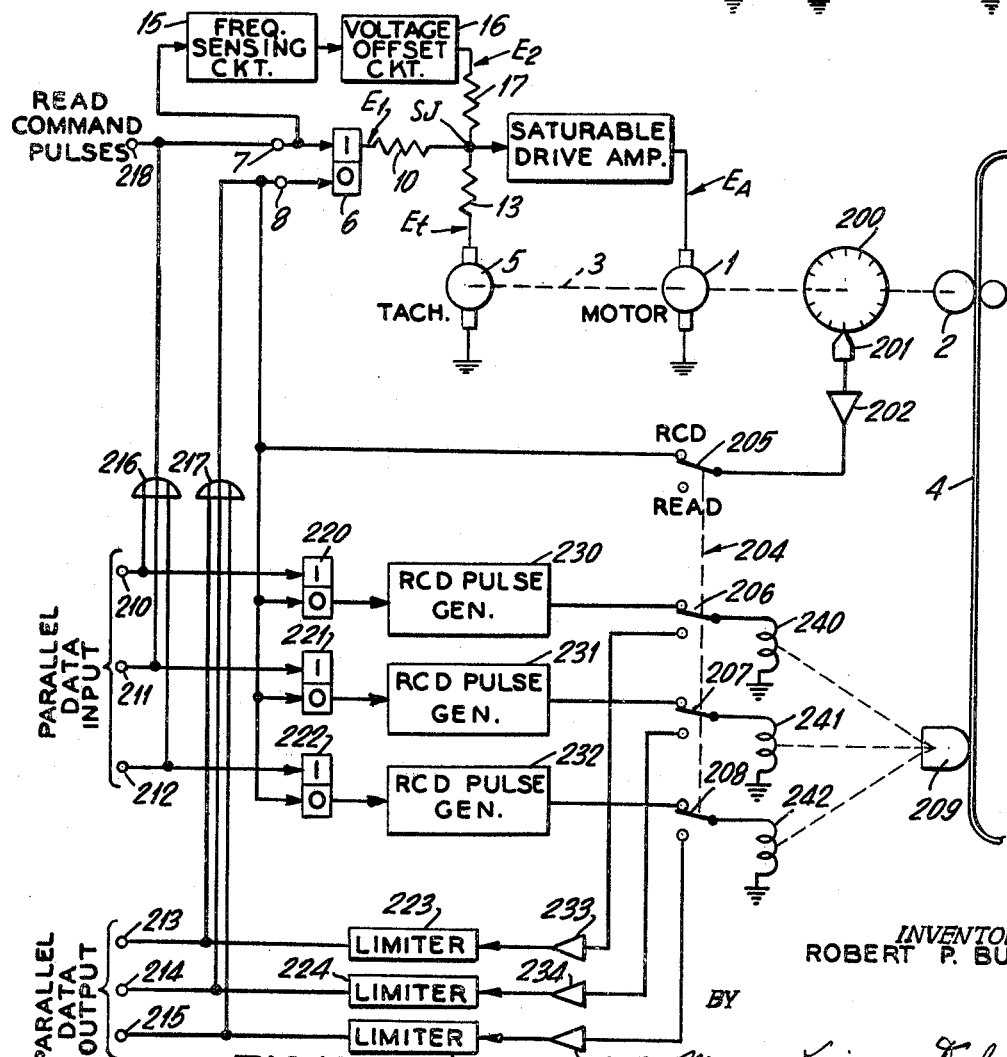
FIGURE 13 is a schematic diagram of a tape system using a timing disc.

The system illustrated in FIGURE 13 handles digital data in a parallel format and is designed to record the individual bits of a character simultaneously in individual tracks on the tape. Normally, the character will include five or more bits, depending upon the code being used, but for simplicity, a three track system for recording three bit characters is illustrated in FIGURE 13.

The drive system including components 1-17 is the same as previously described in FIGURE 4 except for the addition of a timing disc 200 secured to shaft 3 of the drive motor. The timing disc can be an opaque disc having holes therein spaced at regular intervals near the periphery of the disc which cooperate with a photoelectric detector circuit 201 that provides an electrical pulse each time a hole passes the detector. As an alternative, timing disc 200 can have a magnetic surface at its periphery in which equally spaced magnetic marks are prerecorded. The associated detector circuit 201 would be a magnetic read head which produces an electrical pulse each time a magnetic mark is detected. The spacing between the holes or magnetic marks on timing disc 200 determine the bit locations on the magnetic tape during recording, and are therefore spaced accordingly.

When recording data on the magnetic tape, record-read switch 204 is placed in the position as shown with movable contacts 205-208 in the positions as shown.

The incoming data is applied to terminals 210-212 which are connected to the set inputs of flip flop circuits 220-222, which form a temporary storage register for the incoming data. Accordingly, when the character is received flip flop circuits 220-222 assume states corresponding to the incoming data, that is, the flip flop circuit is placed in the set state if the incoming bit is a "one" and remains in the reset state if the incoming bit is a "zero."

Terminals 210-212 are also connected to the inputs of a three input OR circuit 216, the output of which is connected to terminal 7 of the drive system. Since the incoming data will include a "one" supplied to at least one of terminals 210-212, a pulse will pass through OR circuit 216 and be applied to terminal 7 as a start command. In response to this start command the drive system accelerates to the running speed.

Shortly after reaching running speed, detector circuit 201 provides a pulse designating the bit location on the tape. This pulse passes through pulse amplifier 202 and movable contact 205 and is then applied to the reset inputs of flip flop circuits 220-222. As a result, the register is cleared and the flip flop circuits are reset to produce transients if the flip flop has previously been placed in the set state by an incoming "one" bit. The reset outputs of flip flop circuits 220-222 are coupled to windings 240-242 in the read-write heads via record pulse generators 230-232 and movable contacts 206-208, respectively. The record pulse generators respond to the transient provided by the flip flop circuits while being reset, and in response to these transients, produce a pulse suitable for energizing windings 240-242 to record magnetic marks on the tape. Thus, the bits of the character temporarily stored in flip flop circuits 220-222 are recorded on the separate tracks of the magnetic tape. The pulse passing through amplifier 202 is also supplied to terminal 8 as a stop command and causes the drive system to decelerate.

During the recording operation the drive system operates in either the random incremental mode, the synchronous incremental mode or the phase locked servo mode depending upon the rate at which the incoming data is supplied to terminals 210-212.

When retrieving data from the magnetic tape, record-read switch 204 is placed in its alternate position so that movable contacts 206-208 connect windings 240-242 to separate pulse amplifiers 233-235 respectively.

The reading of a character from the tape is initiated by a read command pulse applied to terminal 218. The read command pulses can be generated internally, but are usually received from the external equipment receiving the data. Terminal 218 is connected to terminal 7 of the drive system and therefore the incoming read command pulses are utilized as start commands to initiate acceleration to running speed.

Shortly after reaching running speed a recorded character will be detected by the read heads associated with the individual tracks and therefore will generate pulses in one or more of windings 240-242 in accordance with the detected character. The pulses from windings 240-242 passes through movable contacts 206-208, pulse amplifiers 233-235 and limiter circuits 223-225 to data output terminals 213-215, respectively. The limiter circuits act as pulse shapers to provide the desired output pulses. The outputs of limiter circuits 223-225 are connected to the three inputs of an OR circuit 217, the output of the OR circuit being connected to terminal 8 of the drive system. One or more of the bits of the character read from the tape will be a "one" and therefore a pulse passes through OR circuit 217 and is applied to terminal 8 as a stop command to initiate deceleration of the drive system.

During the reading operation the drive system operates in either the random incremental mode, the synchronous incremental mode or the phase locked servo mode depending upon the rate at which read commands are applied to terminal 218. Although the system described in FIGURE 13 is a parallel data system, it is likewise capable of recording serial data. In a serial format, however, the system must either receive clock pulses with the serial data or must internally generate the synchronizing pulses for controlling the recording operation, i.e. similar to the manner previously described in FIGURE 12.

Tape system utilizing a record gap circuit

Figure 14:
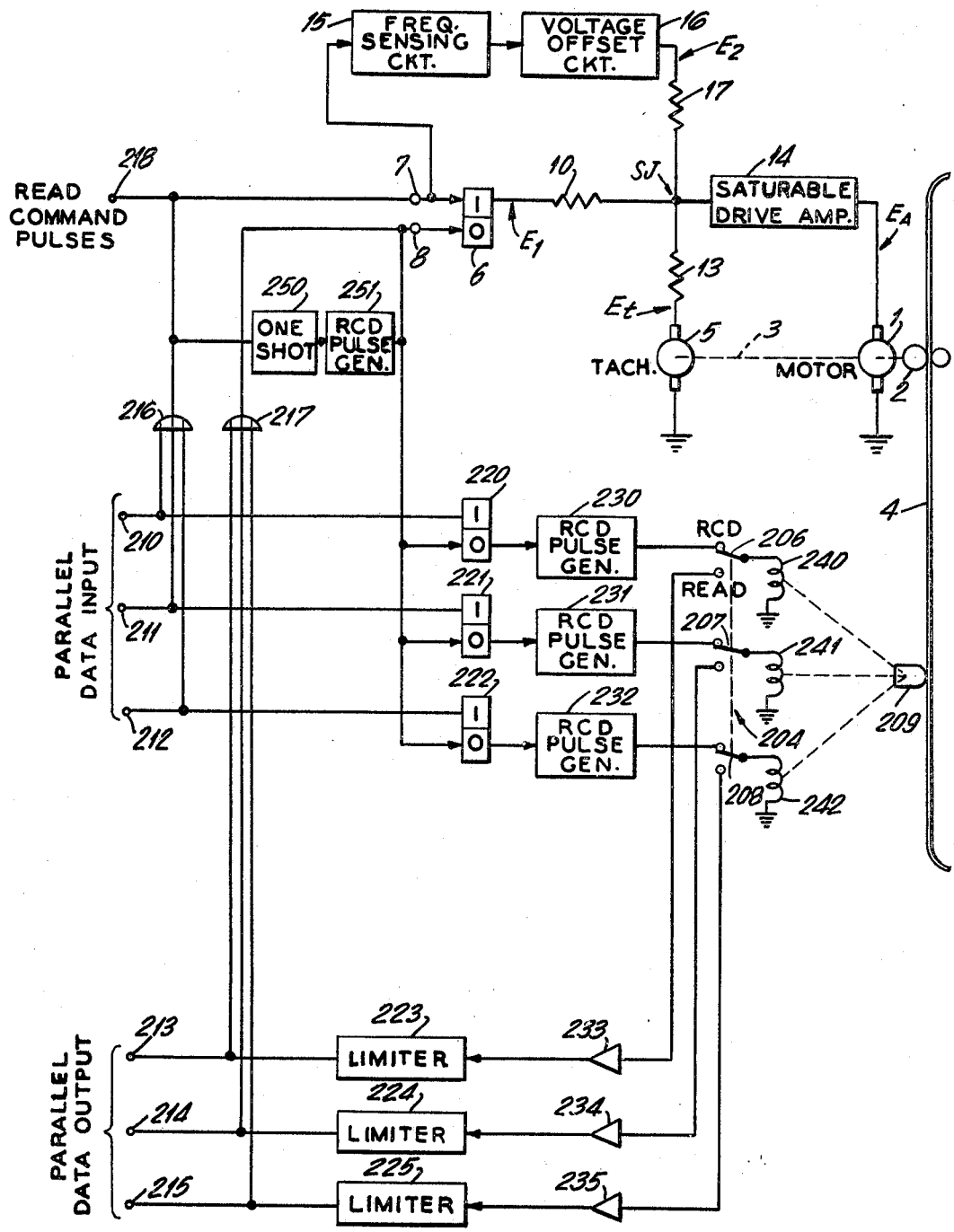
FIGURE 14 is a schematic diagram of a tape system using record gap circuitry.

The system in FIGURE 14 is similar to that described in FIGURE 13 and therefore like reference numerals are utilized throughout with respect to like components.

The essential difference is that record gap circuitry is used in FIGURE 14 in place of the timing disc. The output of OR circuit 216 is coupled to the input of a one-shot multivibrator circuit 250 which in turn is connected to the input of a record pulse generator 251. The time interval during which the one-shot circuit is in the active state in response to an applied pulse from OR circuit 216 is selected so that it is slightly greater than the time required for the drive system to accelerate to running speed. Record pulse generator 251 responds to the negative transient provided by the one-shot circuit as it returns from the active state to the quiescent state. The output of pulse generator 251 is connected to the reset inputs of flip flop circuits 220–222 which form the temporary storage register for incoming data. The pulse from pulse generator 251 is also applied to terminal 8 of the drive system as a stop command.

When recording a data character on the magnetic tape, the incoming data is applied to terminals 210–212 and temporarily stored in flip flop circuits 220–222. The incoming data also causes a pulse to pass through OR circuit 216 and this pulse is applied to terminal 7 as a start command to accelerate the drive system. Soon after the drive system has attained running speed, pulse generator 251 provides a pulse which resets flip flop circuits 220–222 thereby transferring the data to the magnetic tape. The same pulse from pulse generator 251 is also applied to terminal 8 to initiate deceleration of the drive system.

In the reading mode, operation is initiated by a read command pulse applied to terminal 218 which initiates operation of the drive system and accelerates the tape to running speed. Shortly after reaching running speed a character is detected on the tape and corresponding pulses are transferred to output terminals 213–215 in accordance with the detected character. As a result, a pulse passes through OR cricuit 217 and is applied to terminal 8 as a stop command to initiate deceleration.

During the recording and reading operations, the drive system will operate in either the random incremental mode, the synchronous incremental mode or the phase locked servo mode depending upon the rate of the incoming data during the recording operation, or the rate of the read command pulses during the reading operation. In high speed operations it may be desirable to decrease the duration of the record gap provided by one-shot circuit 250 which can easily be achieved by varying the duration of the active state in accordance with the amplitude of drive signal $E_2$.

Buffer tape system

Figure 15:
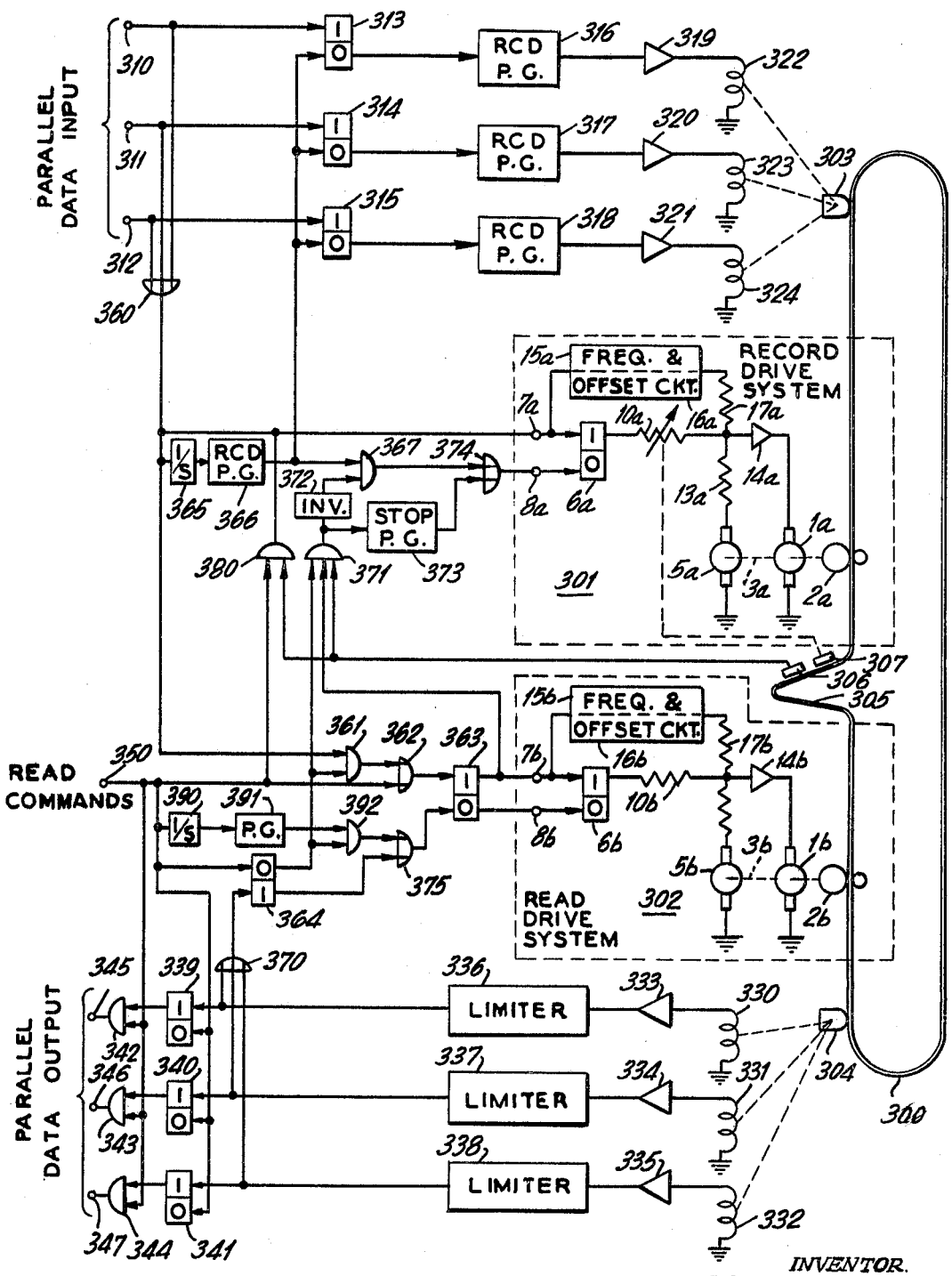
FIGURE 15 is a schematic diagram of a buffer tape system.

The system shown in FIGURE 15 is a buffer system wherein the data is recorded on a continuous length of tape 300. The system includes a separate recording system comprising record heads 303 and a drive system 301, and a separate reading system comprising read heads 304 and a drive system 302. Incoming data is recorded as it is received, and data can be retrieved from the system either simultaneously or subsequently, as desired.

The distance between the recording apparatus and the reading apparatus is as small as possible to minimize the length of tape which must exist therebetween, i.e. the tape loop 305. When no data is stored on the tape, loop 305 is drawn up into a "tight tape" condition. The "tight tape" condition wherein the loop is of a minimum desired size is detected by a photo electric circuit 306 which provides a positive output signal used to modify the motor control logic. A second photo electric circuit 307 detects when the tape loop attempts to decrease further beyond the minimum permissible size and provides a signal used to alter the speed of one of the motor drive systems to alleviate this condition. As the quantity of incoming data exceeds the quantity of data retrieved from the system, data is stored on the portion of tape between write heads 303 and read heads 304 and therefore the size of tape loop 305 increases.

The logic control circuits for motor drive systems 301 and 302 provide several modes of operation as follows:

(I) When the tape is empty and the first incoming character is received, a "tight tape" condition will exist and therefore both drive systems are energized. The character is recorded on the tape and advanced to the reading system where the character is read and transferred to a temporary output storage register.

(II) When a character is stored in the temporary output storage register and another incoming character is received, only the record drive system is energized and the character is recorded thereby increasing the size of tape loop 305.

(III) When a read command is received and a "tight tape" condition does not exist, the character in the temporary output storage register is transferred out and only the read drive system is energized until the next character is read from the tape and transferred to the output register.

(IV) When a read command is received and a "tight tape" condition does exist, the character in the output register is transferred out and both drive systems are energized until the next character is read and transferred to the output register thereby permitting all data to be removed from the tape.

For illustrative purposes the system in FIGURE 15 is shown as a multitrack system capable of recording three bit characters received in a parallel format whereas an actual system would be designed to handle characters usually consisting of five or more bits. The recording channels are shown at the top of FIGURE 15, the read channels are shown at the bottom, and the drive control logic circuits which provide the start and stop commands, and the drive systems which respond to these commands, are shown in the center portion of FIGURE 15.

The incoming data is applied to terminals 310–312 which are connected to the set inputs of flip flop circuits 313–315, respectively, which form an incoming data storage register. The reset outputs of flip flop circuits 313–315 are connected to record pulse generators 316–318, respectively. These pulse generators respond to the transient produced by the associated flip flop circuit during the transition from the set state to the reset state and provide corresponding record pulses. The record pulses are supplied to energize windings 322–324 in record heads 303 and pass via pulse amplifiers 319–321, respectively.

Thus, an incoming character is initially stored in flip flop circuits 313–315 which assume states corresponding to the respective bits of the incoming character, i.e. the associated flip flop circuit is placed in the set state if the incoming bit is a "one," and remains in the reset state if the incoming bit is a "zero." When a reset pulse is applied to the reset inputs of flip flop circuits 313–315, a transient is produced by the flip flop circuits then in the set state and pulse generators 316–318 respond to these transients to produce corresponding pulses which in turn energize selected ones of windings 323–324 to record the character on the tape.

The reading channels include windings 330–332 associated with the individual read heads 304 associated with the individual tracks on tape 300. Windings 330–332 are connected to the set inputs of flip flop circuits 339–341 via pulse amplifiers 333–335 and pulse shaping, limiter circuits 336–338, respectively. The set outputs of the flip flop circuits are each connected to an input of an associated AND circuit 342–344, respectively, and the outputs of these AND circuits are connected, respectively, to output terminals 345–347. Terminal 350 receives read commands from an external source and is connected to the other inputs of AND circuits 342–344 as well as the reset inputs of flip flop circuits 339–341.

When a character is detected on tape 300, selected ones of windings 330–332 are energized to in turn place corresponding ones of flip flop circuits 339–341 in the set state. Flip flop circuits 339–341 form the temporary output storage register and accordingly assume states corresponding to the character read from the tape, that is, a flip flop circuit is placed in the set state if the corresponding detected bit is a "one" and remains in the reset state if the corresponding bit is a "0" (indicated by the absence of a magnetic mark in the tape). Those of AND circuits 342–344 associated with the flip flop circuits which are in the set state are conditioned and, therefore, when a read pulse is applied to terminal 350 it passes through the conditioned ones of the AND circuits. Accordingly, the character temporarily stored in the output register is transferred to output terminals 345–347. The same read pulse applied to terminal 350 resets flip flop circuits 339–341 and thereby places the register in condition for receiving the next character from the tape.

Drive system 301 is essentially the same as the system previously described in FIGURE 4 and components corresponding to reference characters 1–17 in FIGURE 4 are designated respectively by reference characters 1a–17a in FIGURE 15. Drive capstan 2a is located relatively close to record heads 303, and both of these components are located ahead of tape loop 305 so that the drive system advances the tape toward the loop. Resistor 10a coupling the set output of flip flop circuit 6a to the summing junction is a light responsive resistor forming part of the photoelectric detection circuit 307. Under conditions where both drive systems are simultaneously energized, it is possible for read drive system 302 to advance the tape slightly faster than record drive system 301 which could bring about a condition where the tape loop is decreased beyond the minimum permissible size. Under these conditions a light beam strikes resistor 10a which in turn decreases its resistance value to thereby increase the magnitude of the energizing signal applied to the summing junction at the input of amplifier 14a. The servo controlled speed of the record drive system increases accordingly to thereby prevent the tape loop 305 from decreasing beyond the minimum permissible size. Read drive system 302 is the same as the drive system previously described in FIGURE 4 and the components thereof are designated with reference characters 1b–17b corresponding to reference characters 1–17, respectively, in FIGURE 4. Record heads 304 and capstan 2b are relatively close together and are located on the other side of tape loop 305 to thereby draw tape from the loop when the drive system is energized.

The portion of the control logic circuits which provide the start commands to both drive systems in response to the first incoming character (Mode I) include OR circuit 360, AND circuit 361, OR circuits 362 and 375 and flip flop circuits 363 and 364. Terminals 310–312 which receive the incoming data character are connected to the inputs of OR circuit 360. The output of OR circuit 360 is connected directly to terminal 7a in record drive system 301 and is also connected to one input of a two input AND circuit 361. The set output of flip flop circuit 364 is connected to the reset input of flip flop circuit 363 via OR circuit 375, and the reset output of flip flop circuit 364 is conected to the other input of AND circuit 361. The output of the AND circuit 361 is connected to the set input of flip flop circuit 363 via OR circuit 362. The set and reset outputs of flip flop circuit 363 are connected to the set and reset inputs, respectively, of flip flop circuit 6b via terminals 7b and 8b, and hence, flip flop circuit 6b will always assume the same state as flip flop circuit 363.

Under mode I conditions, tape 300 is empty and the temporary output storage register including flip flop circuits 339–341 is likewise empty. Under these circumstances, flip flop circuit 364 is in the reset state and therefore AND circuit 361 is conditioned. When the first character is applied to terminals 310-312, at least one of the bits thereof is a "one" and therefore a pulse passes through OR circuit 360 and is applied to terminal 7a as a start command for the record drive system. The same pulse passes through conditioned AND circuit 361 and OR circuit 362 to place flip flop circuits 363 and 6b in the set state, and hence, the read drive system is also energized. Accordingly, in response to the first character both drive systems are energized and rapidly accelerate the tape to running velocity. Tape loop 305 remains in the "tight tape" condition.

After a suitable interval of time sufficient to permit the tape to achieve running speed, a record gap circuit including a one-shot circuit 365 coupled to a record pulse generator 366 provides a pulse which initiates the transfer of the character from the incoming data storage register to the tape. More specifically, the output of OR circuit 360 is connected to the input of one-shot circuit 365 which has a time constant selected so that the circuit remains in the activated state for a time interval slightly greater than that required for the tape to achieve running speed. Record pulse generator 366 responds to the transient produced by the one-shot circuit when it returns to the quiescent state. The output of pulse generator 366 is connected to the reset inputs of flip flop circuits 313–315, and therefore initiates the transfer of the data from the storage register to the tape after the tape has achieved running speed. As will be explained hereinafter, AND circuit 367 is not conditioned under these circumstances and therefore the pulse provided by pulse generator 366 is not supplied to terminal 8a as a stop command.

The stop command in mode I is provided when the first character has been read from the tape and transferred to the output storage register. The portion of the logic control circuits which provide the stop command include OR circuits 370, 374 and 375, flip flop circuits 363 and 364, AND circuit 371, and stop pulse generator 373. The outputs of limiter circuits 336–338 are connected to the inputs of OR circuit 370 which in turn is connected to the set input of flip flop circuit 364. Therefore, as data is transferred from the tape to the output storage register, a pulse will pass through OR circuits 370 to place flip flop circuit 364 in the set state. The set output of flip flop circuit 364 is coupled to the reset input of flip flop circuit 363 via OR circuit 375 and, therefore, when flip flop circuit 364 is placed in the set state, flip flop circuits 363 and 6b are placed in the reset state to thereby initiate deceleration of read drive system 302.

The reset output of flip flop circuit 364, the set output of flip flop circuit 363 and photoelectric circuit 306 are connected to three inputs of AND circuit 371. During the running condition in mode I, flip flop circuit 364 is in the reset state, flip flop circuit 363 is in the set state, and a "tight tape" condition exists and, therefore, all inputs of AND circuit 371 are energized and a positive signal appears at the output of this AND circuit. The output of AND circuit 371 is coupled to one of the inputs of AND circuit 367 via an inverter circuit 372 and therefore during the running interval AND circuit 367 is not conditioned and therefore blocks pulses from pulse generator 366. When a character is transferred from the tape to output storage register 339–341, flip flop circuit 364 is placed in the set state thereby removing one of the input signals to AND circuit 371 and therefore the output of AND circuit 371 falls to zero. Stop pulse generator 373 is connected to the output of AND circuit 371 and responds to this transient to produce a pulse which passes through OR circuit 374 to terminal 8a in the record drive system 301. This pulse serves as a stop command to initiate deceleration in record drive system 301.

Accordingly, when the character is transferred to the output register in mode I operation both the record and the read drive systems are de-energized and the tape decelerates.

The system operates in mode II when a character is stored in flip flop circuits 339–341 of the output register. Under these circumstances flip flop circuit 364 is in the set state and therefore AND circuit 361 is not conditioned. When an incoming character is applied to terminals 310–312 the data character is stored in the incoming data storage register and a pulse passes through OR circuit 360 and is applied as a start command to terminal 7a in the record drive system. Accordingly the record drive system accelerates the running speed. The pulse passing through OR circuit 360 is blocked by AND circuit 361 and therefore does not affect read drive system 302. The pulse passing through OR circuit 360 does reach one-shot circuit 365 which is then placed in the active state for a period of time sufficient to permit the tape to accelerate. After the tape has accelerated to running speed, pulse generator 366 provides an output pulse which resets flip flop circuits 313–315 and therefore transfers the data character to the tape. Since a character is already present in the output register, flip flop circuit 364 is in the set state and therefore one of the inputs is absent at AND circuit 371. The output of the AND circuit is zero and therefore inverter circuit 372 provides a positive signal to condition AND circuit 367. The pulse from pulse generator 366 therefore not only transfers the data from the incoming storage register to the tape, but also passes through AND circuit 367 and OR circuit 374 so that it is applied as a stop command to terminal 8a. Accordingly, in a mode II operation the record drive system operates independently of the read drive system and increases the size of tape loop 305 as successive characters are recorded.

A mode III type operation is initiated in response to a read command applied to terminal 350 when a "tight tape" condition does not exist. The read pulse applied to terminal 350 passes through those of AND circuits 342–344 which are conditioned by the corresponding flip flop circuits 339–341 in the temporary output storage register, and thus, the character stored in the register is transferred to output terminals 345–347. The same read command resets flip flop circuits 339–341 and flip-flop circuit 364. The same read command also passes through OR circuit 362 to place flip flop circuits 363 and 6b into the set state and therefore read drive system 302 accelerates to running speed.

Shortly after the tape has reached running speed a character is detected and transferred to the output storage register 339–341. As this occurs, a pulse passes through OR circuit 370 and places flip flop circuit 364 in the set state which in turn places flip flop circuits 363 and 6b in the reset state to initiate deceleration of the drive system.

The system is designed so that all data recorded on the tape can be retrieved including the data existing between recording heads 303 and read heads 304 when a "tight tape" condition exists. In order to advance the tape without decreasing the size of tape loop 305 it is necessary that both drive systems be energized to advance the tape in response to a read command, this being the mode IV situation. The read command applied to terminal 350 passes directly to the set input of flip flop circuit 363 via OR circuit 362 and therefore places flip flop circuits 363 and 6b in the set state to initiate acceleration of the read drive system 302. A start command for the record drive system is supplied via AND circuit 380. Terminal 350 is connected to one input of AND circuit 380 and the output of photoelectric circuit 306 which provides a positive signal in the "tight tape" condition is connected to the other input of the AND circuit. The output of AND circuit 380 is connected to terminal 7a. Thus, when a "tight tape" condition exists, AND circuit 380 is conditioned and therefore read command pulses are applied to initiate acceleration in both drive systems.

During the following run interval a "tight tape" condition exists, flip flop circuit 363 is in the set state, and flip flop circuit 364 is in the reset state. Therefore, all inputs of AND circuit 361 are energized. However, as soon as a character is detected and transferred to the output register, flip flop circuit 364 is placed in the set state removing one of the inputs of AND circuit 371 which causes the output of the AND circuit to fall to zero. Stop pulse generator 373 responds to this transient and produces a pulse which passes via OR circuit 374 to provide a stop command at terminal 8a. When flip flop circuit 364 returns to the set state, a signal passes through OR circuit 375 placing flip flop circuits 363 and 6b in the reset state to decelerate the read drive system. Accordingly, both drive systems receive a stop command when the character is detected and transferred to the output registers.

It is possible for a read command to be received when the tape is empty and therefore both drive systems would be energized to search for a data character which does not exist. Under these conditions one-shot circuit 390 and pulse generator 391 provide the stop commands. Terminal 350 is coupled to the input of one-shot circuit 390 which is placed in the active state for a period of time sufficient to permit the portion of tape 300 between heads 303 and 304 to advance past the read heads. Pulse generator 391 responds to the transient produced by the one-shot circuit when returning from the active state to the quiescent state and produces a corresponding pulse which is supplied to one input of an AND circuit 392. The reset output of flip flop circuit 364 is connected to the other input of AND circuit 392, and the output of the AND circuit is coupled to the reset input of flip flop circuit 363 via OR circuit 375. Thus, if a data character is not detected and flip flop circuit 364 remains in the reset state when a pulse is produced by pulse generator 391, AND circuit 392 is conditioned and the pulse passes through to reset flip flop circuits 363 and 6b which in turn resets flip flop circuit 6a via AND circuit 371, pulse generator 373 and OR circuit 374.

In the various modes I, II, III and IV the drive systems operate either in a random incremental mode, a synchronous incremental mode, or a phase locked servo mode depending upon the rate at which the incoming data is received or the rate at which the read commands are applied. The system is illustrated as a parallel data system, but could easily be modified to function with a serial data format. The system could also be designed to receive both serial and parallel data and to provide serial and parallel output data by the addition of a serial to parallel converters coupled to data input and data output terminals. The tape 300 in FIGURE 15 is shown as a continuous length of tape, but under some circumstances it may be desirable to construct a buffer system wherein the tape is supplied from a reel and taken up on a separate reel.

Mechanical transport apparatus

Transport apparatus directly suitable for use in the systems illustrated in FIGURES 12–14 is shown in FIGURE 1. The apparatus is mounted on a tape deck 400 which may include flanges 401 at the edges to facilitate rack mounting.

The tape is advanced from a supply reel 402 to a take up reel 403. Reel 403 is removably secured to the shaft of reel servo motor 404 advantageously of the printed circuit type. Motor 404 is mounted behind the tape deck with its shaft extending through the deck and available for reel mounting. Reel 402 is similarly removably mounted on the shaft of a separate reel servo motor (not shown) similarly mounted behind the tape deck.

The tape 405 leaving reel 402 passes around guide rollers 406 anad 407 near the top of the tape deck, passes around a capstan 2, then passes around guide rollers 408 and 409, and is thereafter taken up by reel 403. Guide rollers 406–409 are journaled for free rotation on suitable shafts secured to the tape deck. Rollers 407 and 408 are relatively close together to provide a relatively large wrap around angle of the tape around capstan 2. This arrangement provides a large area of frictional contact between the capstan and the tape to minimize slippage therebetween. Capstan 2 is mounted on the shaft of a motor (not shown) mounted behind the tape deck as was previously explained in connection with FIGURES 4 and 12–15.

A tensioning roller 412 engages tape 405 between reel 402 and guide roller 406 and is journaled on a shaft which passes through an arcuate slot 413 and is secured to a suitable tensioning arm located behind the tape deck. A second tensioning roller 414 similarly engages tape 405 between guide roller 409 and take up reel 403 and is journaled on a shaft which passes through arcuate slot 415 and is secured to a separate tensioning arm behind the tape deck. The tensioning arms are urged toward one another forming tape loops 416 and 417 and thereby maintain the tape in balanced loop tension relative to capstan 2. Loops 416 and 417 also provide tape reservoirs which largely eliminate the effective inertia of the tape reels when tape 405 is advanced by capstan 2 since tape can be drawn from loop 416 and supplied to loop 417 without moving the reels. The reel servo circuits including the reel servo motors respond to the positions of the tensioning arms and tend to maintain tape loops 416 and 417.

The magnetic read-write heads 420 are located between capstan 2 and guide roller 408 on the oxide coated side of the tape and are operatively positioned to record magnetic marks on the tape and read magnetic marks from the tape. Pressure pads 421 can be located on the opposite side of the tape to insure proper contact with the tape.

The transport apparatus is generally symmetrical relative to capstan 2 and therefore the system can be operated in either direction by applying suitable control signals.

A similar transport system is shown in FIGURE 2 wherein the balanced loop tensioning is achieved by vacuum columns instead of tensioning arms.

The tape is advanced from a supply reel 450 to a take up reel 451 by means of capstan 2 mounted on the shaft 3 of drive motor 1. The tape 452 upon leaving supply reel 450 passes around a guide roller 453, forms a loop 454 in a vacuum column 455, passes around guide roller 456, capstan 2 and guide roller 457, then forms a second loop 458 in vacuum column 459, passes around a guide roller 460 and is taken up on reel 451. Vacuum columns 455 and 459 are rectangular enclosures, having an open end through which the tape enters, and smaller openings 461 and 462 at the opposite ends which are coupled to suitable vacuum pumps 463 and 464. The partial vacuum created in the columns by pumps 463 and 464 draws the tape into the column and maintains loops 454 and 458. As a result, the tape is maintained in a balanced loop tension relationship relative to capstan 2, and the effective inertia of the reels is eliminated.

Reel 450 is driven by a servo motor 473 which is energized by a position sensing circuit 472 in a manner which maintains the proper sized tape loop in the vacuum column. If the loop becomes too small it comes into contact with a tape detector 470 and if the loop becomes too large it comes into contact with tape detector 471. The position sensing circuit increases or decreases the energization of motor 473 as is required to maintain the end of tape loop 454 between position detectors 470 and 471. The servo circuit for reel 451 is similar and includes motor 483, position sensing circuit 482, and tape detectors 480 and 481 which maintain the end of tape loop 458 between detectors 480 and 481.

Guide rollers 456 and 457 are relatively close together to provide a large wrap around angle of the tape around the capstan. The read-write heads 490 are positioned to engage the tape intermediate capstan 2 and roller 457.

The mechanical portion of the tape buffer system shown in FIGURE 15 is illustrated in FIGURE 3. The apparatus is mounted on a tape deck 514 having suitable tape confining rails 515 secured to the outer edges of the tape deck and similar tape confining rails 516 surrounding the centrally located capstan arrangement and read and write heads. Tape 300 is a continuous length of tape and is freely distributed in the tape storage areas between the outer and inner tape confining rails 515 and 516.

Positioning blocks 500 to 503 define transport channels 508 and 509 from the tape storage area on one side of the record heads 303, and positioning blocks 504 to 507 form similar transport channels 510 and 511 from record heads 303 to the storage area on the other side. Between transport channels 509 and 510 the tape passes around a pair of freely rotating guide rollers 512 and 513 journaled on shafts secured to the tape deck. Unit 303 includes the magnetic record heads and is positioned between rollers 512 and 513 slightly beyond the point of engagement with the tape when taut between the rollers and is operative to record magnetic marks on the individual tracks of the tape.

Drive motor 1a of the record drive system 301 is mounted beneath the tape deck with its shaft 3a extending above the tape deck. The direct tape drive capstan arrangement includes a pulley 520 secured to the free end of shaft 3a and a drive belt 521 driven by the pulley and positioned to frictionally engage the tape in a non-sliding fashion in the area between rollers 512 and 513. Belt 521 is made from a suitable flexible material such as rubber and has a width approximately the same as the width of tape 300. The belt passes around the outside of pulley 520 and outside a pair of guide rollers 522 and 523 journaled on shafts secured to the tape deck. Rollers 522 and 523 are located outside rollers 512 and 513 and are positioned so that as the belt is drawn taut it urges the tape toward rollers 512 and 513 as well as toward record heads 303.

A tensioning roller 524 is located outside the drive belt loop and engages the belt between pulley 520 and roller 522. The tensioning roller is journaled on a shaft which passes through an arcuate slot 525 in the tape deck and is secured to the end of a tensioning arm (not shown) beneath the tape deck. A second tensioning roller 526 similarly engages the drive belt between pulley 520 and roller 523 and is likewise journaled on a shaft passing through an arcuate slot 527 secured to a second tensioning arm beneath the tape deck. Suitable springs are connected to the tensioning arms to urge tension rollers 524 and 526 toward one another to thereby provide balanced tensioning of the drive belt.

The read drive system 302 is essentially the same as record drive system 301. The tape is advanced from the storage area at the right through transport channel 511, a transport channel 534 between positioning blocks 530 and 531, around a roller 536, across read heads 304, around another roller 527, through transport channel 535 between positioning blocks 532 and 533, and through transport channel 508 to the tape storage area of the left side. The capstan arrangement 2b includes pulley 538 coupled to the shaft of an associated drive motor, and a belt 539 which passes around pulley 538 and a pair of rollers 540 and 541 to engage the tape in the area between rollers 536 and 537. Rollers 542 and 543 provide balanced tensioning of the drive belt.

A "tight tape" condition exists when tape loop 305 on the right side is withdrawn into transport channel 511. A pair of light sources 550 are located within positioning block 507 to provide light beams passing through the walls of transport channel 511 toward associated light responsive units 306 and 307. When the tape loop is withdrawn so that the end of the loop is positioned between light responsive units 306 and 307 a light beam passes across the transport channel and energizes photoelectric unit 307 which in turn provides an electrical signal indicating the "tight tape" condition. If the tape further withdraws into the transport channel, light also strikes photoelectric unit 306 (including light responsive resistor 10a shown in FIGURE 15) which in turn slightly increases the speed of drive motor 1a to thereby increase the size of the tape loop.

While only a few illustrative embodiments of the invention have been described in detail, it should be obvious to those skilled in the art that there are many possible further variations. The invention is more particularly defined in the appended claims.

What is claimed is:

1. In a tape transport system responsive to start and stop commands, the combination of
    a drive element in constant frictional engagement with said tape;
    a DC motor coupled to said drive element;
    circuit means connected for energizing said motor to achieve an acceleration characteristic in response to a start command;
    circuit means connected for energizing said motor to achieve a deceleration characteristic in response to a stop command;
    circuit means for energizing said motor with a drive signal of a selected magnitude corresponding to a desired running speed during the interval between acceleration and deceleration; and
    circuit means for varying the magnitude of said drive signal as a function of the occurrence rate of said commands.

2. A tape transport system in accordance with claim 1 wherein said circuit means for varying the magnitude of said drive signal has no effect upon said drive signal until the occurrence rate of commands exceeds a predetermined frequency and thereafter increases the magnitude of said drive signal linearly as a function of command pulse frequency.

3. In a tape transport system, the combination of
    a capstan in continuous non-sliding engagement with the tape;
    a high torque, low enertia, electrical drive motor directly coupled to said capstan;
    acceleration pulse generating circuit means connected to energize said motor with a current pulse to achieve an acceleration characteristic in response to a start command;
    deceleration pulse generating circuit means connected to energize said motor with a reverse current pulse to achieve a deceleration characteristic in response to a stop command;
    a servo speed control circuit coupled to said motor including
        speed sensing means coupled to said motor and operative to provide a feedback signal related to the speed of said motor, and
        drive amplifier means coupled to energize said motor in accordance with the difference between said feedback signal and a drive signal;
    circuit means coupled to said servo speed control circuit to provide said drive signal of a selected magnitude during the interval between acceleration and deceleration; and circuit means connected to said servo speed control circuit for modifying said drive signal as a function of the command pulse occurrence rate.

4. A tape transport system in accordance with claim 3 wherein said drive amplifier is saturable,
    said acceleration pulse generating circuit being included in said saturable drive amplifier to provide said current pulse when said saturable drive amplifier is driven into saturation in one direction, and
    said deceleration pulse generating circuit being included in said saturable drive amplifier to provide said reverse current pulse when said saturable amplifier is driven into saturation in the opposite direction.

5. In a tape drive system responsive to start and stop commands, the combination of
    a capstan in continuous frictional engagement with the tape;
    a DC drive motor coupled to said capstan;
    a saturable drive amplifier connected to energize said drive motor;
    tachometer means coupled to said motor and connected to provide a feedback signal to the input of said drive amplifier proportional to the motor speed;
    first circuit means for supplying a first drive signal of a selected magnitude to the input of said drive amplifier during the interval between a start command and the following stop command;
    second circuit means for supplying a second drive signal to the input of said drive amplifier which is a function of the occurrence rate of said commands;
    the characteristics of said saturable drive amplifier beig so selected that the energization signal applied to said motor includes
        an acceleration pulse provided when said amplifier is driven into saturation in one direction in response to the drive signals from said first and second circuit means exceeding said feedback signal by a predetermined amount,
        a deceleration pulse provided when said amplifier is driven into saturation in the opposite direction in response to said feedback signal exceeding said drive signals from said first and second circuit means by a similar predetermined amount, and a servo speed control signal when said drive amplifier is not driven into saturation.

6. A tape drive system in accordance with claim 5 wherein said first circuit means includes a bistable circuit which is driven into active state to provide said first drive signal in response to a start command and which is driven into a deactive state in response to a stop command.

7. A tape drive system in accordance with claim 5 wherein said second drive signal is zero until the occurrence rate of said commands exceeds a predetermined frequency and thereafter increases linearly as a function of frequency.

8. A tape drive system in accordance with claim 7 wherein said second circuit means includes a frequency sensing circuit for providing a signal proportional to the occurrence rate of said commands, a voltage offset circuit for providing a signal equal and opposite to said signal proportional to said occurrence rate at said predetermined frequency, and circuit means responsive to the sum of said signals when the said occurrence rate is above said predetermined frequency to provide said second drive signal proportional to said sum.

9. A tape transport system in accordance with claim 5 further comprising a summing circuit including
    an operational amplifier having its output coupled to said drive amplifier,
    individual resistors for coupling said first drive signal, said second drive signal and said tachemeter feedback signal to a summing junction at the input of said amplifier, and
    a negative feedback resistor connected between said summing junction and the output of said operational amplifier.

10. In a motor drive system operative in incremental and phase lock modes in response to start and stop commands, the combination of
    a DC drive motor;
    bistable circuit means responsive to the commands and operative to provide a first drive signal during the interval between a start command and the following stop command;
    frequency responsive circuit means responsive to said commands and operative to provide a second drive signal which is zero when the occurrence rate of commands is below a predetermined frequency and which increases linearly as a function of frequency thereafter;
    speed responsive means coupled to said motor to provide a feedback signal proportional to the motor speed;
    a saturable drive amplifier connected to energize said motor being responsive to the difference between said feedback signal and the sum of said drive signals, said amplifier being driven into opposite states of saturation to provide, respectively, accelerating current pulses and decelerating reverse current pulses, and being operative in a linear range to provide servo speed control in accordance with the magnitude of said first drive signal during the interval between acceleration and deceleration when the system operates incrementally, and said amplifier making a gradual transition into a phase locked mode where said amplifier operates in its linear range wherein the average motor speed corresponds to the average value of the sum of said first and second drive signals.

11. A motor drive system responsive to start and stop commands comprising
  a DC motor
  circuit means connected for energizing said motor to achieve an acceleration characteristic in response to a start command;
  circuit means connected for energizing said motor to achieve a deceleration characteristic in response to a stop command;
  circuit means for energizing said motor with a drive signal of a selected magnitude corresponding to a desired running speed during the interval between acceleration and deceleration; and
  circuit means for varying the magnitude of said drive signal as a function of the occurrence rate of said commands.

12. In a tape transport system responsive to start and stop commands, the combination of
  a capstan in continuous driving relation with the tape;
  a DC drive motor coupled to said capstan;
  speed responsive means coupled to said motor to provide a feedback signal proportional to the motor speed;
  bistable circuit means responsive to the start and stop commands and operative to provide a first drive signal during the interval between start command and the following stop command;
  frequency responsive circuit means responsive to the start and stop commands and operative to provide a second drive signal as a function of the occurrence rate of said commands; and
  drive amplifier means connected to energize said motor and responsive to the difference between said feedback signal and the sum of said first and second drive signals.

13. A tape transport system in accordance with claim 12 further including circuit means coupled to said bistable circuit means to decrease the magnitude of said first drive signal as the occurrence rate of said commands increases.

14. A tape transport system in accordance with claim 12 further including circuit means coupled to paid speed responsive means to decrease the magnitude of signal variations in said feedback signal as the frequency thereof increases.

15. A tape transport system in accordance with claim 12 wherein said second drive signal provided by said frequency responsive circuit means is zero until the occurrence rate of said commands exceeds a predetermined frequency and thereafter increases linearly as a function of the occurrence rate of said commands.

16. A tape transport system in accordance with claim 12 wherein said drive amplifier is saturable and driven into saturation in one direction to provide a current pulse for accelerating said motor when the sum of said drive signals exceeds said feedback signal by a predetermined amount, and driven into saturation in the opposite direction to provide a reverse current pulse for decelerating said motor when said feedback signal exceeds the sum of said drive signals by a predetermined amount.

17. In a system for recording digital data on tape, the combination of
  means for recording digital data on the tape;
  a capstan in constant engagement with said tape;
  a DC drive motor coupled to said capstan;
  circuit means connected for energizing said motor to achieve an acceleration characteristic in response to the receipt of data to be recorded;
  circuit means connected for energizing said motor with a drive signal to maintain a selected tape velocity after the acceleration interval;
  circuit means coupled to said recording means and said motor
    to activate said recording means to record data on the tape while moving at said selected tape velocity, and
    to energize said motor to achieve a deceleration characteristic substantially immediately after said data is recorded; and
  circuit means for increasing said drive signal as a function of the occurrence rate of received data.

18. In a system for recording digital data on tape, the combination of
  a capstan in constant engagement with the tape;
  a DC drive motor coupled to said capstan;
  drive circuits connected to energize said motor including
    circuit means connected for energizing said motor to achieve an acceleration characteristic in response to a start command;
    circuit means connected for energizing said motor to achieve a deceleration characteristic in response to a stop command;
    circuit means for energizing said motor with a drive signal of a selected magnitude corresponding to a desired running speed during the interval between acceleration and deceleration; and
    circuit means for varying the magnitude of said drive signal as a function of the occurrence rate of said commands;
  an input storage register for receiving data to be recorded;
  circuit means coupled between said register and said drive circuits to provide start command in response to the receipt of data; and
  timing means coupled to said register and said drive circuits for transferring data from said register and recording the same on the tape after running speed has been achieved and substantially immediately thereafter supplying a stop command to said drive circuits.

19. A recording system in accordance with claim 18 wherein said timing means includes a clock track on the tape and means for providing an electrical pulse in response to detection of a mark on said clock track, said pulse being used to initiate transfer of data to the tape and being applied to said drive circuits as a stop command.

20. A recording system in accordance with claim 18 wherein said timing means includes a timing disc coupled to said motor having regularly spaced indicia thereon, and detector means operative to provide an electrical pulse in response to detection of said indicia, said pulse being used to initiate transfer of data to the tape and being applied to said drive circuits as a stop command.

21. A recording system in accordance with claim 18 wherein said timing means includes a timing circuit for producing an electrical pulse a predetermined period of time after receipt of data, said pulse being used to initiate transfer of data to the tape and being applied to said drive circuits as a stop command.

22. In a tape reading system, the combination of a capstan in constant engagement with the tape;
  a DC drive motor coupled to said capstan;

drive circuits connected to energize said motor including
- circuit means connected for energizing said motor to achieve an acceleration characteristic in response to a start command;
- circuit means connected for energizing said motor to achieve a deceleration characteristic in response to a stop command;
- circuit means for energizing said motor with a drive signal of a selected magnitude corresponding to a desired running speed during the interval between acceleration and deceleration; and
- circuit means for varying the magnitude of said drive signal as a function of the occurrence rate of said commands;

circuit means for applying a start command to said drive circuit to thereby initiate the read-out operation;

reading means coupled to the tape for detecting data thereon; and circuit means coupled between said reading means and said drive circuits for applying a stop command to said drive circuits in response to the detection of data.

23. In a magnetic tape reading and recording system, the combination of
- a magnetic tape;
- a drive element in constant frictional engagement with said tape;
- a DC motor coupled to said drive element;
- drive circuits responsive to start and stop commands for energizing said motor including
  - circuit means connected for energizing said motor to achieve an acceleration characteristic in response to a start command;
  - circuit means connected for energizing said motor to achieve a deceleration characteristic in response to a stop command;
  - circuit means for energizing said motor with a drive signal of a selected magnitude corresponding to a desired running speed during the interval between acceleration and deceleration; and
  - circuit means for varying the magnitude of said drive signal as a function of the occurrence rate of said commands.
- read-write means coupled to said tape to record magnetic marker thereon and to detect previously recorded magnetic marks;
- circuit means operative during the recording mode
  - to provide a start command to said drive circuits in response to receipt of data to be recorded,
  - to transfer said received data to said read-write means for recording on said tape after running speed has been achieved, and
  - to provide a stop command to said drive circuits substantially immediately after the transfer of said data;
- circuit means operative during the reading mode
  - to provide a start command to said drive circuits when data is requested,
  - to thereafter transfer out the data when detected, and
  - to provide a stop command to said drive circuits substantially immediately after data is detected.

24. A magnetic tape system in accoordance with claim 23 further including an incoming data storage register for storing incoming data until the same is transferred to said tape.

25. In a magnetic tape buffer system the combination of
- a magnetic tape
- separate record and read drive systems each including
  - a drive element in constant frictional engagement with said tape;
  - a DC motor coupled to said drive element;
  - circuit means connected for energizing said motor to achieve an acceleration characteristic in response to a start command;
  - circuit means connected for energizing said motor to achieve a deceleration characteristic in response to a stop command;
  - circuit means for energizing said motor with a drive signal of a selected magnitude corresponding to a desired running speed during the interval between acceleration and deceleration.
- at least one of said record and read drive systems further including therein circuit means for varying the magnitude of the drive signal in the associated drive system as a function of the occurrence rate of commands applied thereto;
- an input data storage register;
- record means coupled to said input register and associated with said record drive system, said record means being operatively coupled to said tape to record data thereon;
- an output data storage register;
- read means coupled to said output register and associated with said read drive system, said read means being operatively coupled to said tape to retrieve data therefrom;
- a tape loop in said magnetic tape between said record means and said read means;
- central circuit means coupled to said registers and said drive systems to achieve the following modes of operation.
  - (I) To apply a start command to both of said drive systems in response to the first incoming data, to transfer said data from said input register to said tape via said recording means when running speed is achieved, and to apply stop commands to both of said drive systems when said data is detected and transferred to said output register,
  - (II) When data is in said output register, to apply a start command to said record drive system in response to incoming data, to transfer said incoming data from said input register to said tape via said record means when running speed is achieved, and to apply a stop command to said record drive system substantially immediately after said incoming data is transferred,
  - (III) When said tape loop is larger than a predetermined minimum size, to apply a start command to said read drive system in response to a request for data, and to provide a stop command to said read drive system when data is detected and transferred to said output system, and
  - (IV) When said tape is of said predetermined minimum size, to apply a start command to both of said drive systems in response to a request for data, and to apply a stop command to both of said drive systems when data is detected and transferred to said output register.

26. The buffer system in accordance with claim 25 further comprising circuit means operative in said mode IV to provide stop commands to both of said drive systems in the event that data is not detected in a predetermined time interval following a request for data.

27. In a magnetic tape buffer system the combination of
- a magnetic tape
- separate record and read drive systems each including
  - a drive element in constant frictional engagement with said tape;
  - a DC motor coupled to said drive element;
  - circuit means connected for energizing said motor to achieve an acceleration characteristic in response to a start command;
  - circuit means connected for energizing said motor to achieve a deceleration characteristic in response to a stop command;

circuit means for energizing said motor with a drive signal of a selected magnitude corresponding to a desired running speed during the interval between acceleration and deceleration;

at least one of said record and read drive systems further including therein circuit means for varying the magnitude of the drive signal in the associated drive system as a function of the occurrence rate of commands applied thereto;

record means for receiving incoming data and recording the same on said tape;

read means for detecting data previously recorded on said tape;

a tape loop in said magnetic tape between said record means and said read means;

first control circuit means responsive to incoming data and coupled to said record means and said record drive system, said first control circuit means being operative
- to apply a start command to said record drive system in response to incoming data,
- to record said incoming data on said tape when running speed is achieved, and
- to apply a stop command to said record drive system substantially immediately after said incoming data is recorded;

second control circuit means responsive to requests for data and coupled to said read means and said read drive system, said second control circuit means being operative when said tape loop is larger than a predetermined minimum size
- to apply a start command to said read drive system in response to a request for data, and
- to apply a stop command to said read drive system when data is detected on said tape; and third control circuit means responsive to requests for data and coupled to said read means and both of said drive means, said third control circuit means being operative when said tape loop is of said predetermined minimum size
- to apply start commands to both of said drive systems in response to a request for data, and
- to apply stop commands to both of said drive systems when data is detected on said tape.

28. In a tape transport system reponsive to start and stop commands, the combination of a tape;

a drive element in constant, non-sliding, functional engagement with said tape;

means for maintaining said tape in balanced loop tension relative to said drive element;

a DC motor coupled to said drive element;

circuit means connected for energizing said motor to achieve an acceleration characteristic in response to a start command;

circuit means connected for energizing said motor to achieve a deceleration characteristic in response to a stop command;

circuit means for energizing said motor with a drive signal of a selected magnitude corresponding to a desired running speed during the interval between acceleration and deceleration; and circuit means for varying the magnitude of said drive signal as a function of the occurrence rate of said commands.

29. A tape transport system in accordance with claim 28 wherein said means for maintaining said tape in balanced loop tension comprises a pair of mechanical tensioning devices for maintaining a tap loop on each side of said drive means.

30. A tape transport system in accordance with claim 28 wherein said means for maintaining said tape in balanced loop tension comprises a pair of vacuum columns for maintaining a tape loop on each side of said drive means.

References Cited
UNITED STATES PATENTS 3,185,364   12/1968   Kleist _____ 226—49

BERNARD KONICK, Primary Examiner

LEE J. SCHROEDER, Assistant Examiner

U.S. Cl. X.R.

226—43, 122; 318—6, 341, 345